(12) United States Patent
Moore et al.

(10) Patent No.: US 7,890,452 B2
(45) Date of Patent: Feb. 15, 2011

(54) METHODS FOR ENTERPRISE-LEVEL DATA AND PROCESS ACCESS AND PRESENTATION

(75) Inventors: Dennis B. Moore, Hillsborough, CA (US); Andreas Vogel, San Francisco, CA (US)

(73) Assignee: SAP AG, Walldorf (DE)

( * ) Notice: Subject to any disclaimer, the term of this patent is extended or adjusted under 35 U.S.C. 154(b) by 538 days.

(21) Appl. No.: 11/181,644

(22) Filed: Jul. 13, 2005

(65) Prior Publication Data

US 2007/0016557 A1    Jan. 18, 2007

(51) Int. Cl.
G06F 7/00        (2006.01)
G06F 17/00      (2006.01)

(52) U.S. Cl. ..................... 707/608; 707/805

(58) Field of Classification Search .............. 707/3, 707/792, 944, 608, 805, 999.001, 999.002
See application file for complete search history.

(56) References Cited

U.S. PATENT DOCUMENTS

| | | | |
|---|---|---|---|
| 5,566,291 A | 10/1996 | Boulton et al. | |
| 6,266,805 B1 | 7/2001 | Nwana et al. | |
| 6,286,137 B1 | 9/2001 | Bleizeffer et al. | |
| 6,442,557 B1* | 8/2002 | Buteau et al. | 707/102 |
| 6,549,949 B1* | 4/2003 | Bowman-Amuah | 709/236 |
| 6,854,088 B2 | 2/2005 | Massengale et al. | |
| 6,889,197 B2 | 5/2005 | Lidow | |
| 6,892,192 B1 | 5/2005 | Geddes et al. | |
| 7,155,715 B1 | 12/2006 | Cui et al. | |
| 7,302,401 B1 | 11/2007 | Tervonen | |
| 2001/0028364 A1 | 10/2001 | Fredell et al. | |
| 2002/0059425 A1 | 5/2002 | Belfiore et al. | |
| 2002/0073080 A1* | 6/2002 | Lipkin | 707/3 |
| 2003/0120659 A1 | 6/2003 | Sridhar | |
| 2003/0125929 A1 | 7/2003 | Bergstraesser et al. | |
| 2003/0212586 A1 | 11/2003 | Majd et al. | |
| 2003/0236732 A1 | 12/2003 | Cimral et al. | |
| 2004/0187140 A1 | 9/2004 | Aigner et al. | |
| 2004/0220791 A1 | 11/2004 | Lamkin et al. | |
| 2005/0039119 A1 | 2/2005 | Parks et al. | |
| 2006/0229922 A1 | 10/2006 | Levy et al. | |

FOREIGN PATENT DOCUMENTS

WO    WO 00 60510    10/2000

OTHER PUBLICATIONS

T. Alan Keahey, Getting Along: Composition of Visualization Paradigms, Visual Insights, Inc.

Cockburn, et al., Design Issues for World Wide Web Navigation Visualisation Tools, New Zealand.

Non-Final Office Action dated Jun. 11, 2008 for U.S. Appl. No. 11/254,144.

Final Office Action mailed Jul. 17, 2008 for U.S. Appl. No. 11/254,169.

(Continued)

*Primary Examiner*—Vincent Boccio
(74) *Attorney, Agent, or Firm*—Blakely, Sokoloff, Taylor & Zafman

(57) ABSTRACT

Presentation methods are determined from a work context and/or user preferences. The presentation methods can be combined in any manner with various navigational methods and working modes, to present any type of enterprise data to a user.

21 Claims, 11 Drawing Sheets

OTHER PUBLICATIONS

Final Office for U.S. Appl. No. 11/254,144, mailed Dec. 29, 2008.
Final Office Action for U.S. Appl. No. 11/254,144, Mailed Dec. 28, 2009, 15 pages.
Non-Final Office Action for U.S. Appl. No. 11/254,144 Mailed Jul. 7, 2009, 24 pages.

* cited by examiner

METHODS FOR ENTERPRISE-LEVEL DATA AND PROCESS ACCESS AND PRESENTATION

RELATED APPLICATION

This application is related to U.S. patent application Ser. No. 11/254,144, entitled "METHODS AND APPARATUS FOR PROCESS THUMBNAIL VIEW," filed Oct. 18, 2005; and related to U.S. patent application Ser. No. 11/254,169, entitled "METHODS AND APPARATUS FOR COMPARISON OF PROJECTS," filed Oct. 18, 2005.

FIELD

Embodiments of the invention relate to enterprise systems, and more particularly to methods of presenting enterprise data to a user.

BACKGROUND

The flow of work in an enterprise system is largely influenced by the available methods of access and presentation of enterprise data to the user. The limit on the number of combinations of visualization and access methods of the various types of enterprise data and events can cause inefficiencies in the ability of persons to do their work within an enterprise system.

Existing software applications, for example, MICROSOFT OFFICE products have features that allow users to navigate in the software, and to view and select actions from menus, in order to do their work on a computer. However, the number and combinations are often very limited.

SUMMARY

In an enterprise system a user device may execute a software program. The execution of the software working mode is selected for one or more operations associated with the software program. The working mode can be used to derive a visualization method for presenting enterprise data to the user in the context of the software program. The user accesses the data to be presented with the selected visualization program with a navigational program. Multiple combinations of visualization paradigm, working mode, and navigational method can be used to access and present any type of enterprise-level data.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
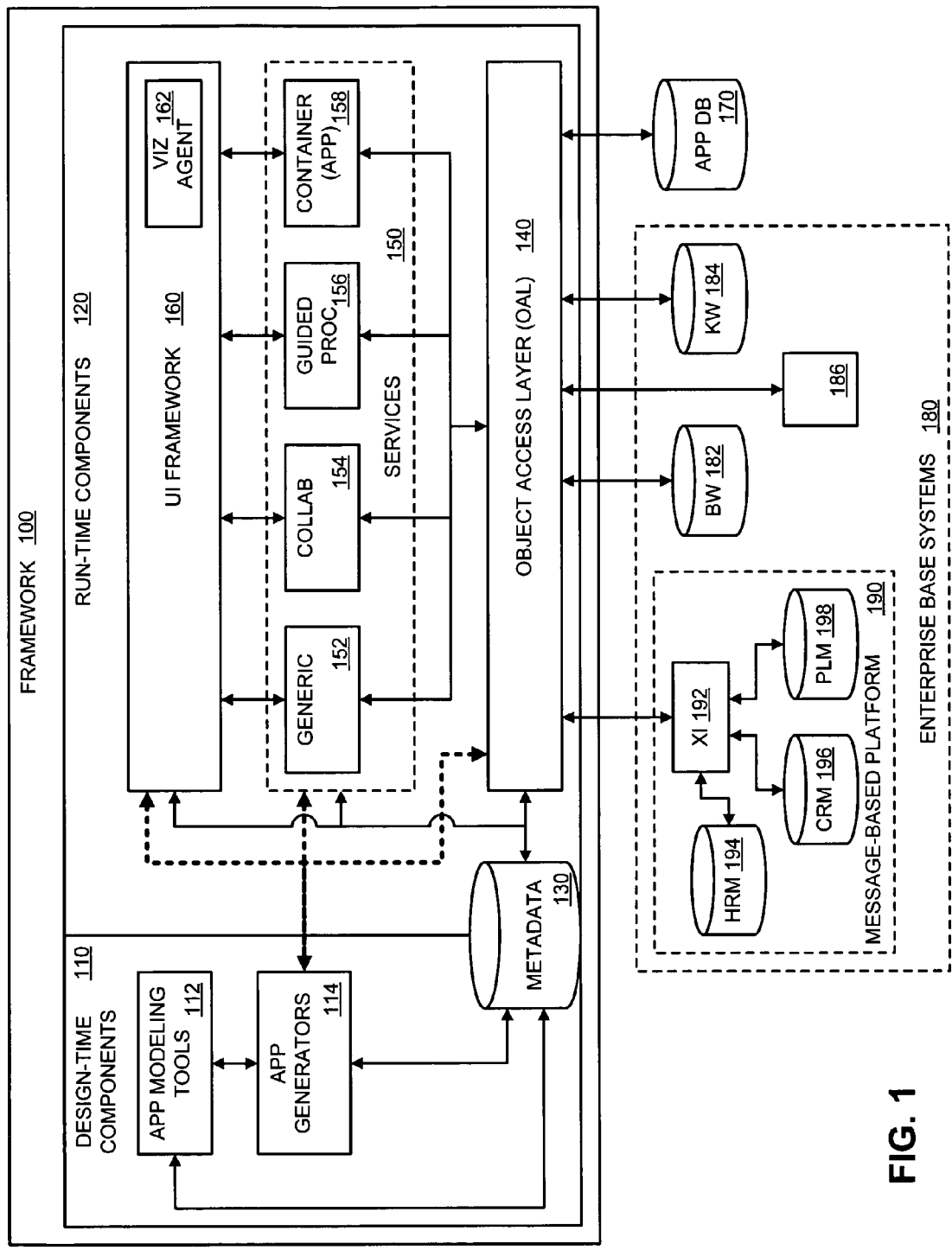
FIG. 1 is a block diagram of an embodiment of a composite application framework with a visualization agent.

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

In accessing and presenting enterprise information/processes, a system may take into account personal preferences, work context, and working mode. The personal preferences can allow a user to select from among various different working modes or work contexts in which to have information presented. The working mode can be one of many different possible modes, for example, exploration operation mode, search operation mode, detailed work and decision making operation mode, process analysis operation mode, and reporting mode. The enterprise information or processes accessed and presented can be any of a number of different data and/or events, for example, master data or business objects, process metadata, smart forms, exceptions/alerts, project events, collaboration data, and/or help/tips/support information. The accessing or navigating to information or processes may be implemented with different linking or navigation mechanisms/methods, for example, an action panel, a smart tag, an object link, a menu item, a right-button mouse click, and/or a push event. The presenting of the information may be implemented with different visualizations, for example, fish eye view, tabular view, chart form, relationship diagram, semantic network, project cockpit view, and/or with presenting relevant information via an automated voice method. The different implementations, visualizations, modes, and events/data can be combined in any combination to render a many permutations.

One skilled in the art will generally understand the different working modes, data/event types, navigation methods, and presentation methods. A brief description of each follows for purposes of clarity. The exploration operation working mode generally allows a user to browse or research. The exploration mode may include providing access to databases, documentation, or other information stores, as well as browsing projects or processes, for example to determine its stage of development/progress. The exploration mode may focus on the gathering of information to coordinate, manage, or work on a process. The search operation working mode generally allows a user to seek specific information. The search operation working mode may include providing mechanisms for focusing on and finding a specific activity, data item, process, project information, etc. The detailed work and decision making operation working mode generally allows a user to perform specific operations within the scope of a project, process, or document. The detailed work and decision making operation working mode refers to how work gets done, and may include providing documents, processes, data, etc., to allow development, purchasing, scheduling, decision making, etc. The process analysis operation working mode generally allows a user to work with a process. The process analysis operation working mode may include viewing processes and related data to enable evaluation of a process and/or comparison with other processes. The reporting working mode generally allows a user to report information regarding a project or a process. The reporting mode may include generation of report documents and saving or sending the documents, as well as mechanisms for interactive filling of forms (e.g., across a network). The reporting working mode may focus on the transfer of information regarding progress on a project, completion or status of a step in process, etc.

The enterprises information and processes is to be understood to include any data, process, and/or event that may be available within an enterprise system. In one embodiment the system takes into account permissions associated with a user to determine data to which a user should have access, and/or an amount of data available to an accessing user. The enterprise information or processes may include master data or business objects, which refer generally to management information, project or process coordination data, etc. Process metadata may refer to related or incidental that may not be strictly considered part of a process, but provides information or insight into a process, a direction or end result of the process, etc. Smart forms may refer to documents or programs that allow the incorporation of external material. The external material may be from other documents, or be provided interactively with a user. Smart forms can be used to avoid duplication of information already available elsewhere in the enterprise system. Exceptions/alerts may refer to warnings or errors resulting from a process or an action that produce an unexpected or unwanted condition/action. The exception can be generally triggered, for example, by an unrecognized condition, or triggered by a specific condition for which the system watches. Project events may refer to access of a project, which may be a series or group of related or dependent processes, steps, and/or actions, or may refer to something spawned by a process, step, or action of a project. A user may instigate access to the project, or a project action may prompt a user to provide input. A project event may refer to initiating a project step, or providing input or reviewing a step in the project. Collaboration data may refer to information that provides for the comparison and/or synchronization of effort, or the coordination of a process. Help/tips/support information may refer generally to "suggestions," which may be offered as help data, as well as prompts to a user. In the context of the system described herein, the suggestion may be general (e.g., spelling changes), as well as specific to a project on which a user is working (e.g., providing possibilities of specific information pulled from the enterprise that could complete a particular form the user is filling out).

The navigation methods can include many different mechanisms for accessing or affecting data. In one embodiment the navigation methods can be considered to be activated or triggered. Activation or triggering of a navigation method may occur by a user selecting the particular mechanism (e.g., performing a mouse-over, clicking on a menu item, etc.). The activation or triggering prompts the system to enable the action associated with the navigation mechanism or method. As to some specific types of navigation, an action panel may refer to a list of action options displayed within a tab or a screen. The action panel may refer to options available to the user for performing specific functions or engaging in specific processes or providing specific information. A smart tag may refer to an XML (extensible markup language) embedded "tag" within a document. The smart tag may recognize words, sets of words, application programs, databases, etc., and provide a service or function when a recognized combination is found. For example, the smart tag may bring up a series of documents, begin an application, link to a database, launch a website, charge a purchase to an account or credit card number, append version related information to an edited document, etc. A smart tag can link together back end systems to enable a user to work, in one application, with live data from various sources, as provided herein. An object link may refer to an embedded trigger within a document or a program to provide a link to another item (e.g., a process, a data element), which may have particular characteristics that are related or similar. A menu item may refer to an item in a program, for example, a drop-down menu. A menu item may be considered to be similar to an action panel, and an object link may be considered to be similar to a smart tag. A right-button mouse click may refer to a resulting menu or selection from activating a secondary, utility button on a mouse. Note that most mice that include two or more buttons default to having the left button provide selection, and the right button to provide alternative functions or utilities (e.g., bringing up a menu). Many mice allow for the right and left button functionality to be swapped. Many mice also include a third, generally, middle button, which may provide additional features to a user. The expression "right-button mouse click" will be used generically herein to refer to the triggering of a utility button, and is not to be viewed as limiting. A push event may refer to a prompt or an action brought up for a user that may not be directly instigated by the user. As one example, an entity or process outside the context of the program in which the user is working may cause a prompt to be presented to the user.

The data may be presented in many different forms, which may or may not be native to the program in which the user is operating. For example, a program may present information in a particular form, and the same form of presentation or another may be provided in which to present data to the user. A fish eye view may refer to a presentation of information where details of data or processes are shown for elements close in layout or close in relatedness to information being browsed or worked on by a user. For example, in an EXCEL spreadsheet, when a user is viewing a particular cell, cells within close proximity, or cells with related data may be highlighted or show specific details, while other cells may not. In another example, a software program or working environment may have multiple panels or panes of information, and when a user is working within a particular panel, close panels may display detailed information, which more distant panels may simply show a title or subject heading. A tabular view may refer to the display of information in tables, or lists of data. A chart form may refer to various types of information display, for example, a pie chart, a bar graph, a graphical representation, or other form of chart. A chart is well suited for showing how data compares to other data. A relationship diagram may refer to a diagram or visual representation that shows relatedness and/or interaction between processes or data. The visual representation may include block or flow diagrams, and may show directly how elements are related. A semantic network may refer to a graphic representation of knowledge in patterns of interconnected nodes and arcs. A semantic network may show clusters of information and may provide information as to how a node is related to another node. A project cockpit view may refer to a project-driven display having the main tasks, processes, steps, aspects, of a project in a single view. Details may be available upon drilling down into a particular section of the "big-picture" display. Automated voice may provide a method of providing information through the playing of recordings, or through the software "reading aloud" information by generating an audible presentation of the data.

In one embodiment the method of data presentation is determined by an intelligent process that can take into account other information. Thus, different users may be presented the same information with different presentation methods, for example, based on how the data is anticipated to be used by the particular user. The determination of a presentation paradigm can be performed at runtime of a software program, and can take into account the working mode of the user. In one embodiment the working mode is classified depending on an active work context derived from the office or other work environment (e.g., document type, document content, program type, user identity). In one embodiment the working mode classification allows the system to provide different amounts of relatedness data to a user. For example, a user's preferences may indicate that the user desires to seek broad amounts of related information, which may cause the system to provide a different combination of navigation and visualization methods than if the user were seeking narrow amounts of relatedness data.

In one embodiment a presentation paradigm is tagged or associated with a particular working mode, for example, if a particular visualization paradigm is well-suited to a particular working mode. The system can offer a personalization dialogue to the user to allow the user to choose a working mode, and/or change a working mode from an active working mode. Based on the working mode, the user can allow the system to automatically select a particular presentation paradigm, based on the working mode associations.

Combinations of presentation paradigms and navigation methods as described herein can provide for viewing data contextually relevant to content written on productivity documents, such as documents of an office software program (e.g., MICROSOFT OFFICE of Microsoft Corporation of Redmond, Wash., LOTUS NOTES of International Business Machines (IBM) Corporation of Armonk, N.Y., OPENOFFICE of the OpenOffice.org open source project, STAROFFICE of SUN Microsystems, Inc. of Santa Clara, Calif.). The data that is contextually relevant could come from ERP master data and/or other sources. The combinations of visual representations and navigational methods can allow working with known data information from ongoing processes and projects, as well as master data information (e.g., purchasing orders, employee human resources (HR) information, product inventory, etc.). The data can be used in real time on productivity suite documents to better enable a user to perform important tasks. Thus, in one embodiment the data can be accessed and used without having to switch working environments from one software program to another, but accessed all within a particular software program context. The visualization and navigational combinations may also enable a system to provide a user the ability to work with contextual data information types, including master data in ERP systems and events.

In one embodiment data is viewed from a business transaction or process in a manner that reflects a relationship defined in the master data of an enterprise system. Thus, a user can interact with process management systems in a contextual way, while performing work with office suite productivity tools. For example, in MICROSOFT EXCEL allows the use of smart tags, menu items, and an action column on the right. With the combinations defined herein, a user could have access to visualize potentially all information about a project, such as assigned employees, budget, decisions that were made, back-end accounting data, etc., and all in the context of the EXCEL document the user is working upon. The user could thus also refer to content written inside the information documents.

In one embodiment a user (e.g., program manager, project manager) can click on one program band or on one project bar graph, to switch views. The click action opens the view to a progressive disclosure, or a tiered visualization, of a series of menus and choices for exploring further data related to the program or projects. Alternatively the user can access data by using a hyperbolic relatedness browser from a smart tag. In another alternative the user can "mouse-over" a bar graph or a project band, to obtain the underlying data. In another alternative the user click action can render a fish eye visualization to view phases of a project and categorize what work a particular phase requires. The work a phase requires can be, for example, assignments to people who do certain tasks, documents required for certain phases, and so forth.

In one embodiment verbs in a productivity document express a type of working mode, and include links to smart tags from among which the user can click to choose which working mode to use. For example, if a user clicks on a tag labeled "Search for support cases for these items," a search operation work mode can launch with the search scope already set for either searching for support notes, or searching for a particular item. In this way a user can also type in a specific key word, and the system can automatically generate links to related data to be accessed from the context or program in which the user is operating. A hyperbolic relatedness browser can also be used with smart tag links to project or process data.

In one embodiment project and process data are used in a system as described herein to allow different companies engaged in different industries to view industry-specific activities related to their business. For example, an airline company could view airline routes with frequency of travel depicted by a path on a chart linked to a smart tag and hyperbolic relatedness browser system. A visualization could be presented with thicker paths, and/or different colored paths for highly traveled routes, thinner paths for less traveled routes, no path if a route was not being used. Further examples of using a hyperbolic relatedness browser, a project cockpit, a hyperbolic tree structure, or other similar structures, such as a fish eye structure, in combination with smart tags and/or smart documents would be to allow a user to access a dynamic organizational chart or association diagram, access a dynamic view of company subsidiaries, charts of accounts, CAD (computer aided drafting) drawings, maps, and/or vector graphics.

In one embodiment sound is included as a dynamic element in a visual system. For example, a two-dimensional EXCEL (of Microsoft Corporation) spreadsheet can be provided wherein the system would produce a particular sound when a meter reached a certain point on a lower level, rather than using the standard meter display on EXCEL. In a process scenario, a multi-dimensional (e.g., a seven-dimensional) chart can enable graphical rendering of, for example, a competitive relationship with other companies or teams. The chart could depict wins, losses, sales, etc. In an alternative embodiment the multi-dimensional chart can enable rendering other comparisons, for example in Human Resources, for comparing employees by any number of factors (e.g., results, salary, promotions, training). As an alternative to the chart visualization, or in conjunction with it, a spreadsheet visualization could also provide viewing of such comparisons. For data collection, and comparison of data, the data can also be rendered by clustering, and by clustering with a time dependency.

In one embodiment a user's work mode is classified at runtime. Classifying the user's work mode can be accomplished by using metadata with smart tags, where a user interface is tailored to allow the system to interpret the user's work mode and automatically deliver or present future navigated data in a similar mode to that originally chosen by the user. In other words, the user's continuing experience could be directly based on the circumstances or the mode of operation the user has originally chosen. The circumstances may depend on a manner of navigation employed by the user to access the item (i.e., the way the user got to the item), and the context or mode of the work item that the user is working on. For example, an alert that has an event resolution quick link on it could take the user to a decision-making mode, versus the same link on a smart tag accessed while writing an email, which could take the user to continue work in an exploration mode. The classification of the work mode may also depend upon the user's preferences, which may be dynamically obtained, or stored and later accessed, as mentioned above. In one embodiment a developer may decide to limit certain activities or certain programs to a particular one of multiple possible options.

In general, various combinations are presented herein to provide data access and visualization not previously available. In general any combination of a working mode, a presentation paradigm, a navigation method, and a data/event type can be made, where the working mode can be exploration operation mode, search operation mode, detailed work and decision making operation mode, process analysis operation mode, or reporting mode, the presentation paradigm can be fish eye view, tabular view, chart form, relationship diagram, semantic network, project cockpit view, and/or with presenting relevant information via an automated voice method, the navigation method can be via an action panel, a smart tag, an object link, a menu item, a right-button mouse click, and/or a push event, and the data/event type can include master data or business objects, process metadata, smart forms, exceptions/alerts, project events, collaboration data, and/or help/tips/support information. Specific combinations follow. The combinations specified below are to be understood as illustrative, and not an exhaustive list.

Viewing Master Data/Business Objects Viewed in an Exploration Operation Mode

In one embodiment an exploration operation mode is provided as the working mode. In one example, in the exploration operation mode, navigation to any master data associated with a business object in the enterprise system can be provided via a menu item, and can be viewed with a semantic network form of visualization. As used herein, the term "business objects" should be understood to refer to traditional objects, or modeled data objects, information objects, as well as service objects or services in a service-oriented, or service-driven environment. Thus, just as business objects may be mentioned with respect to being associated with data and/or links, in a service-driven system data and/or links may be associated with a service. Thus, any mention of business objects should be understood as including reference to enterprise services.

In one embodiment menu items will appear on a smart tag. For example, each customer may have an associated smart tag. The correct smart tag information can be accessed by determining the identity of the customer. On a customer smart tag, the user may be able to choose from among various actions, for example, "view account information," which can be displayed in a tabular view, "view account team," which can be displayed as an organizational chart or a hyperbolic tree of teams from information about a sales organization. Other actions may include viewing a Support team, Services group, etc., which can be working with the customer account. Another action may be to "view accounts pending purchase orders," which may be presented in tabular form, or potentially, as a simple chart of values associated with each pending purchase order.

In one embodiment, in an exploration mode, master data may be viewed with any of a semantic network form, a fish eye form, a tabular view (i.e., matrix) form, a chart form (e.g., bar chart, pie chart), or with a relational or relationship diagram form of visualization, or received via an automated spoken/voice method in any combination with navigating to or accessing the master data via an action panel, a smart tag, or an object link (drill down) to a business object.

Viewing Master Data/Business Objects in a Search Operation Mode

In one embodiment, in a search operation mode, master data may be viewed with any of a semantic network form, a fish eye form, a tabular view (i.e., matrix) form, a chart form (e.g., bar chart, pie chart), or with a relational or relationship diagram form of visualization, or received via an automated spoken/voice method in any combination with navigating to or accessing the master data via an action panel, a smart tag, or an object link (drill down) to a business object.

Viewing Master Data/Business Objects in a Detailed Work/Decision Making Operation Mode In one embodiment, in a search operation mode, master data may be viewed with any of a semantic network form, a fish eye form, a tabular view (i.e., matrix) form, a chart form (e.g., bar chart, pie chart), or with a relational or relationship diagram form of visualization, in any combination with navigating to or accessing the master data via a menu item, an action panel, or a smart tag to a business object.

Viewing Master Data/Business Objects in a Reporting Operation Mode

In one embodiment, in a reporting operation mode, master data may be viewed with any of a semantic network form, a fish eye form, a tabular view (i.e., matrix) form, or a chart form (e.g., bar chart, pie chart) of visualization, in any combination with navigating to or accessing the master data via a menu item, an action panel, or a push (e.g., an alert) to a business object.

Viewing Data/Events Viewed an Exploration Operation Mode

The exploration operation mode may allow a user to browse through information on an enterprise system. The user may be able to determine what information is relevant to a process or project.

Process Metadata Event

In one embodiment, in the exploration operation mode, a process metadata event in the enterprise system may be viewed with any of a process simulation and comparison, tabular view (matrix), chart (e.g., pie or bar chart), or relationship diagram form of visualization, in any combination with navigating to or accessing the process metadata event via a menu item, an action panel, or an object link (e.g., drill down).

SAP-Initiated Smart Forms Event

In one embodiment a smart forms event may be initiated by a component of an SAPS enterprise system. In one embodiment, in the exploration mode, a smart forms event in the enterprise system may be viewed with any of a fish eye form, a tabular view (e.g., matrix), or a chart (e.g., pie or bar chart) form of visualization, in any combination with navigating to or accessing the smart forms event via a menu item, an action panel, a smart tag, a right-button mouse click, an object link (e.g., drill down), or a push (e.g., alert).

Exceptions/Alerts Event

In one embodiment, in the exploration mode, an exception event in the enterprise system may be viewed with a tabular view (e.g., matrix) form of visualization, or associated data may be received via an automated spoken/voice method, in any combination with navigating to or accessing the exception event via a menu item or a smart tag.

Projects Event

In one embodiment, in the exploration mode, a projects event in the enterprise system may be viewed with any of a fish eye, a project cockpit, a tabular view (e.g., matrix), a relational or relationship diagram form of visualization, or associated data received via an automated spoken/voice method, in any combination with navigating to or accessing the project event via a menu item, an action panel, a smart tag, or an object link (e.g., drill down).

Collaboration Event

In one embodiment, in the exploration mode, a collaboration event in the enterprise system may be viewed with any of a fish eye, a semantic network, a tabular view (e.g., matrix) form of visualization, or associated data received via an automated spoken/voice method, in any combination with navigating to or accessing the collaboration event via a menu item, an action panel, or a smart tag.

Help/Tips/Support Event

In one embodiment, in the exploration mode, a help, tip, or support event in the enterprise system may be viewed with a tabular view (e.g., matrix) form of visualization or associated data received via an automated spoken/voice method, in any combination with navigating to or accessing the help/tip/support event via a menu item, an action panel, or a smart tag.

Events Viewed in a Search Operation Mode

A search operation mode, as discussed above, allows a user to find relevant information to perform work.

Process Metadata Event

In one embodiment, in the search operation mode, a process metadata event in the enterprise system may be viewed with any of a simulation and comparison, tabular view (e.g., matrix), chart (e.g., bar, pie), or relational or relationship diagram form of visualization, in any combination with navigating to or accessing the process metadata event via a menu item.

SAP-Initiated Smart Forms Event

In one embodiment a smart forms event may be initiated by a component of an SAP® enterprise system. In one embodiment, in the search operation mode, a smart forms event in the enterprise system may be viewed with any of a fish eye form, a tabular view (e.g., matrix), or a chart (e.g., pie or bar chart) form of visualization, in any combination with navigating to or accessing the smart forms event via a menu item, an action panel, a smart tag, or a right-button mouse click.

Exceptions/Alerts Event

In one embodiment, in the search operation mode, an exception event in the enterprise system may be viewed with a tabular view (e.g., matrix) or relational or relationship diagram form of visualization, in any combination with navigating to or accessing the exception event via a menu item.

Projects Event

In one embodiment, in the search operation mode, a projects event in the enterprise system may be viewed with any of a project cockpit or a tabular view (e.g., matrix) form of visualization, in any combination with navigating to or accessing the project event via a menu item or an action panel.

Collaboration Event

One example of a collaboration event in the search operation mode is use with Instant Messaging (IM). In one embodiment, in the search operation mode, a collaboration event in the enterprise system may be viewed with any of a fish eye, a semantic network, or a tabular view (e.g., matrix) form of visualization, in any combination with navigating to or accessing the collaboration event via a menu item or an action panel.

Help/Tips/Support Event

In one embodiment, in the search operation mode, a help, tip, or support event in the enterprise system may be viewed with a tabular view (e.g., matrix) form of visualization or associated data received via an automated spoken/voice method, in any combination with navigating to or accessing the help/tip/support event via a menu item, an action panel, or a smart tag.

Events Viewed in a Detailed Work/Decision Making Operation Mode

A detailed work or decision making operation mode allows a user to perform operations or functions relevant to bringing a process or project to completion.

Process Metadata Event

In one embodiment, in the detailed work/decision making operation mode, a process metadata event in the enterprise system may be viewed with any of a simulation and comparison, a tabular view (e.g., matrix), a chart (e.g., bar, pie), or a relational or relationship diagram form of visualization, in any combination with navigating to or accessing the process metadata event via a menu item, an action panel, or a smart tag.

SAP-Initiated Smart Forms Event

In one embodiment a smart forms event may be initiated by a component of an SAP® enterprise system. In one embodiment, in the detailed work/decision making operation mode, a smart forms event in the enterprise system may be viewed with any of a fish eye form, a tabular view (e.g., matrix), or a chart (e.g., pie or bar chart) form of visualization, in any combination with navigating to or accessing the smart forms event via a menu item, an action panel, or a smart tag.

Exceptions/Alerts Event

In one embodiment, in the detailed work/decision making operation mode, an exception event in the enterprise system may be viewed with a tabular view (e.g., matrix) form of visualization, or associated data received via an automated spoken/voice method, in any combination with navigating to or accessing the exception event via a menu item, an action panel, or a smart tag.

Projects Event

In one embodiment, in the detailed work/decision making operation mode, a projects event in the enterprise system may be viewed with any of a fish eye, a project cockpit, a tabular view (e.g., matrix), a relational or relationship diagram form of visualization, or associated data received via an automated spoken/voice method, in any combination with navigating to or accessing the project event via a menu item, an action panel, or a smart tag.

Collaboration Event

In one embodiment, in the detailed work/decision making operation mode, a collaboration event in the enterprise system may be viewed with a tabular view (e.g., matrix) form of visualization, or associated data received via an automated spoken/voice method, in any combination with navigating to or accessing the collaboration event via a menu item, an action panel, or a smart tag.

Help/Tips/Support Event

In one embodiment, in the detailed work/decision making operation mode, a help, tip, or support event in the enterprise system may be viewed with a tabular view (e.g., matrix) form of visualization, or associated data received via an automated spoken/voice method, in any combination with navigating to or accessing the help/tip/support event via a menu item, an action panel, or a smart tag.

Events Viewed in a Reporting Operation Mode

A reporting operation mode can allow a user to provide or access information relative to the status of a project.

Process Metadata Event

In one embodiment, in the reporting operation mode, a process metadata event in the enterprise system may be viewed with any of a semantic network, a fish eye, a tabular view (e.g., matrix), or a chart (e.g., bar, pie) form of visualization, in any combination with navigating to or accessing the process metadata event via a menu item, an action panel, or a push (e.g., alert).

SAP-Initiated Smart Forms Event

In one embodiment a smart forms event may be initiated by a component of an SAP® enterprise system. In one embodiment, in the reporting operation mode, a smart forms event in the enterprise system may be viewed with any of a fish eye form, a tabular view (e.g., matrix), or a chart (e.g., pie or bar chart) form of visualization, in any combination with navigating to or accessing the smart forms event via a menu item, an action panel, a smart tag, a right-button mouse click, an object link, or a push (e.g., alert).

Exceptions/Alerts Event

In one embodiment, in the reporting operation mode, an exception event in the enterprise system may be viewed with any of a semantic network, a fish eye, a tabular view (e.g., matrix), a chart (e.g., bar, pie) form of visualization, in any combination with navigating to or accessing the exception event via a menu item, an action panel, a push (e.g., alert), or a right-button mouse click.

Projects Event

In one embodiment, in the reporting operation mode, a projects event in the enterprise system may be viewed with any of a fish eye, a project cockpit, a tabular view (e.g., matrix), or a chart form of visualization, in any combination with navigating to or accessing the project event via a menu item.

Collaboration Event

In one embodiment, in the reporting operation mode, a collaboration event in the enterprise system may be viewed with a tabular view (e.g., matrix) form of visualization in combination with navigating to or accessing the collaboration event via a menu item.

Help/Tips/Support Event

In one embodiment, in the reporting operation mode, a help, tip, or support event in the enterprise system may be viewed with a tabular view (e.g., matrix) form of visualization in combination with navigating to or accessing the collaboration event via a menu item.

Events Viewed in a Process Analysis Operation Mode

A process analysis operation may allow a user to compare a process to another process or to an expected operation or set of conditions.

Process Metadata Event

In one embodiment, in the process analysis operation mode, a process metadata event in the enterprise system may be viewed with any of a semantic network, a fish eye, a project cockpit, a process simulation and comparison, a tabular view (e.g., matrix), or a chart (e.g., bar, pie) form of visualization, in any combination with navigating to or accessing the process metadata via a menu item or a push (e.g., alert).

SAP-Initiated Smart Forms Event

In one embodiment a smart forms event may be initiated by a component of an SAP® enterprise system. In one embodiment, in the process analysis operation mode, a smart forms event in the enterprise system may be viewed with any of a fish eye form, a tabular view (e.g., matrix), or a chart (e.g., pie or bar chart) form of visualization, in any combination with navigating to or accessing the smart forms event via a menu item, an action panel, a smart tag, a right-button mouse click, an object link, or a push (e.g., alert).

Referring now to the figures, FIG. 1 is a block diagram of an embodiment of a composite application framework with a visualization agent. In general, framework 100 leverages and enhances underlying enterprise base systems 180, which could include one or more of a knowledge management warehouse (KW), a business (intelligence) warehouse (BW), an exchange interface (XI), supporting business transaction systems (e.g., customer relationship management (CRM), human resources management (HRM), product life-cycle management (PLM)), etc., with tools, content, and guidelines to provide a foundation for developing and executing composite applications.

Composite applications typically implement new or additional processes in an existing IT landscape, as opposed to the core transactional processes. Composite applications may also support semi-structured processes, handle event-driven and knowledge-based business scenarios, and/or support collaboration in teams. In one embodiment composite applications may support the JAVA stack. The composite applications may be broken down into various portions, each of which may be separately generated/modeled. The composite application portions may, in one implementation, be implemented as Enterprise Java Beans (EJBs), and in other implementations, the design-time components may have the ability to generate the run-time implementation into different platforms, such as J2EE, ABAP, or .NET.

Framework 100 may provide modeling and configuration tools (e.g., business object modelers, guided procedures), generic components (e.g., user interface (UI) patterns, generic services (functional key actions, help, authorizations)), standardized interfaces (e.g., object access layer), reusable content (e.g., predefined object models, XI content), and/or integration infrastructure (e.g., provide connections to business objects and/or documents, provide access to XI proxies). Framework 100 allows composite applications to be created according to guidelines, or documentation that allows composite applications to be created in a controlled and/or predictable manner. The guidelines may or may not be implemented in software.

Framework 100 may be implemented using readily available technology. For example, framework 100 could be implemented using mySAP technology components. In one embodiment the components may include an SAP WEB APPLICATION SEVER (WAS) to run applications, an SAP ENTERPRISE PORTAL to render applications, an SAP KW to handle unstructured information sources, an SAP BW to provide reporting and analytics, data mining, and planning and simulation, SAP BUSINESS PROCESS MANAGEMENT (BPM), an SAP Exchange Infrastructure (XI) to provide shared integration knowledge separate from applications, and/or SAP WEB SERVICES to offer business functionality over the Internet.

For instance, an SAP WAS may include a J2EE engine, SAP IDE, Universal Workflow, and Deployment Service. The WAS may also include a pattern-based and freestyle-based user interface development and interface module. Also, an SAP ENTERPRISE PORTAL may provide unified access to applications, information, and services by using views, roles, pages, worksets, top-level navigation, and KM. This enterprise portal also provides login management and user management. For KM, unstructured information consists of collaboration and content management. For collaboration, KM enables team-driven business processes, synchronous and asynchronous applications, groupware integration, calendars, bulletin boards, threaded discussions, and collaboration rooms. For content management, KM handles documents, feedback, rating, publishing, subscription, document workflow, versioning, archiving, indexing, searching, and taxonomies. SAP BPM may cover life cycles (e.g., design, development, deployment, and change). An SAP XI may provide external and internal integration of system and connectors to various systems such as ORACLE, SIEBEL, PEOPLESOFT, and/or SAP. The SAP XI may be based on Web services, JAVA, and XML standards. SAP Web services may provide a service provider, service handler, and service user. Additionally, an SAP BW may be used.

In one embodiment the KM and collaboration functionality may be embedded in applications, rather than, or in addition to being found in separate pages in the portal. Framework 100 supports development with any of a number of general development environments, for example, JAVA, with EJB (Enterprise JAVA Beans) 2.0, JDO (JAVA Data Objects), JAVA persistency, and/or JAVA application logic, Advanced Business Application Programming (ABAP), and Web services. Existing ABAP components may be integrated via JAVA connector calls. In one embodiment the complete JAVA stack could be used. Furthermore, Web service technology may be used for remote access.

In general, framework 100 allows composite applications to work with existing system landscapes, because framework 100 can decouple composite applications from the underlying enterprise platform. Decoupling may involve providing communication to back-end systems via a central interface and providing a back-end-independent object model. Providing a back-end-independent object model may be implemented to allow data from the source systems to be transformed into a unified structure. Transforming the data into a unified structure can further allow successive installation, activation, and use of different applications, which may reduce entry costs. Additionally, framework 100 facilitates highly efficient development of composite applications. Development of composite applications can be accomplished by model-driven composition of applications, service-oriented architecture, UI and application patterns, reusable object models, and methodologies. Thus, framework 100 could be viewed as a kind of application factory, which enables application building in part or in whole without programming.

Examples of the types of business processes supported by framework 100 include enterprise change management, product innovation, employee productivity, and enterprise service automation. Enterprise change management may support enterprises when merging, splitting, acquiring, spinning off, or reorganizing. Product innovation may support the life cycle of a product, including the preproduction phase(s) of collecting ideas and consolidating them into concepts, the market launch phase, and the end of life. In dealing with the life cycles of a product, the resources of a PLM and CRM may be drawn upon. Employee productivity aims to increase employee productivity, decrease costs, and increase employee satisfaction. Key functions may include manager self services, employee self services, expert finders, e-procurement, and e-learning. Enterprise resource management (ERM) and business to employee (B2E) resources may be drawn upon to accomplish these tasks. Enterprise service automation provides administration and monitoring functions as well as evaluation tools to facilitate project success, for example, as in the case of setting up a project and staffing the project with people having the required skills and availability to accomplish the project. Additional application families may also be created.

Framework 100 may also provide external services in a shared object environment, for example, by providing a uniform object access layer and service layer that bundle functionality across service components. Furthermore, a transparent mapping may be provided from the application's perspective. Thus, the application built on the framework would not have to know whether certain services are provided by a portal, by a KW, by a WAS, or other external service.

Framework 100 includes design-time components 110, run-time components 120, and metadata repository 130, which is shared by the design-time components and the run-time components. Metadata repository 130 represents an abstraction of one or more data and/or access/service resources design-time components 110 and run-time components 120 may draw on, and is not necessarily to be understood as a resource within one of the components, or available only to the components. In general, design-time components 110 are responsible for developing composite applications that are executed by run-time components 120.

Design-time components 110 provide a repository and user interface for modeling and generating business objects, business services, business processes, user interfaces, and/or other aspects/components of a composite application. A business object may be, for example, an employee, a product, a plant, or any other semantic representation of a real-world entity. A business service is an action taken on a business object. Changing the price or category of a product are examples of services for a business object that represents a product. As another example, gathering input from employees and customers (who may themselves be represented by business objects) for a new product idea could be considered a business service. Combining business services to allow the services to operate together, in sequence and/or in parallel or otherwise in conjunction, produces a business process. A composite application may include any number or combination of business objects, business services, and/or business processes.

Design-time components 110 include application modeling tools 112 and application generators 114. Design-time components 110 may draw on information from metadata repository 130. Modeling tools 112 represents one or more tools that may be used for modeling business objects, business services, business processes, user interfaces, etc. A separate modeling tool may be used for each portion/component/ segment of a composite application. Additionally, a single modeling tool could provide functionality for multiple portions of the composite application. Furthermore, modeling tools 112 may be used for integrating business objects, business services, business processes, user interfaces, etc. Thus, framework 100 may support, model-driven composition of composite applications, allowing for development with little or no programming effort.

In particular implementations, generators 114 allow template-based generation of Java-coding, database tables, entries in metadata repository 130, XML configuration files, etc. This may be implemented with extensibility and the ability to conduct upgrades without loosing his information. This capability may be achieved by allowing the metadata of the new implementation to be compared with the metadata of the existing implementation during an upgrade. If there are implementation-specific extensions, they may be identified, and strategies for solution of possible conflicts may be proposed.

Metadata repository 130 can include metadata about business objects, business services, business processes, and/or other application portions for use in modeling and/or executing the application portions. Thus, an application portion may be modeled, as well as the origin of the data, whether in a local database, remote database, or a combination of the two. In one embodiment the content of metadata repository 130 includes information extending beyond a specific implementation of an application portion. There could be repositories that describe a specific implementation, which may be filled from a more general repository. Metadata repository 130 can be understood as including a general, a specific, or a combination of repository information.

The metadata can enable generic services like automatic generation of default UIs, object access interface, data access methods, persistency, and mappings. Metadata repository 130 stores the content of the composite application (e.g., specific business objects, information about services, and, eventually, processes) and makes the metadata information available at run-time (if needed). Metadata repository 130 may allow different metamodels to be created (the model for business objects being one of them) and to persist the metadata. For specific purposes, additional repositories, such as, for example, a portal content directory (PCD), which may contain portal specific pieces of an application (e.g., views, pages, roles), may be required.

Application generators 114 generate source/executable code from the application portions modeled by modeling tools 112. Application generators 114 may include and/or use templates to generate the code. One or more templates may be stored, for example, in metadata repository 130. In one embodiment application generators 114 are driven by the metadata in metadata repository 130 to automatically create JAVA classes (e.g., for use in run-time components 120) and/or configuration files (e.g., to adjust user interface (UI) patterns to a certain business object). Thus, the connectivity to back-end systems and the application persistency may be generated, as well as a default user interface. Application generators 114 may also generate interfaces for application services, data access logic, and persistency.

Run-time components 120 provide the run-time environment for business objects, business services, business processes, user interfaces, etc., as well as data access abstraction. Run-time components 120 may include object access layer (OAL) 140, service layer 150, and a UI layer including UI framework 160 and visualization (viz) agent 162. Run-time components may draw upon the resources of metadata repository 130. In one embodiment run-time components 120 also use application database 170, which may store additional information for executing the composite applications. For example, application database 170 may store data tables for executing applications.

OAL 140 manages interaction between composite applications and enterprise base systems 180, and can provide a uniform interface for composite applications to enterprise base systems 180. Thus, OAL 140 can reduce the knowledge needed for a composite application developer about the source of data because OAL 140 sits on top of, and embraces different connectivity technologies. OAL 140 may act as a dispatcher to provide access to a variety of data sources. OAL 140 may leverage message-based platform 190, which may include XI 192 with connectivity to underlying applications. The underlying applications can include one or more of HRM 194, CRM 196, or PLM 198. OAL 140 can also leverage business intelligence warehouse (BW) 182 and/or knowledge management warehouse (KW) 184. In general OAL 140 provide connectivity to any underlying application/service, or enterprise base system, and may include some other application or service 186 not specifically described herein.

OAL 140 may also leverage a fairly synchronous infrastructure such as a service-oriented data access, which could be a BW, and a KW repository framework, which may allow connection to document management systems or to LDAP (Lightweight Directory Access Protocol), a more unstructured type of data. Thus, OAL 140 may bring structured and unstructured data closer together.

Coding and configuration data for OAL 140 may be automatically generated, at least in part, by business object metadata in repository 130. Furthermore, OAL 140 allows for local persistency (e.g., connectivity to a local database such as application database 170 to store data). Data synchronization and replication of remote data (e.g., data in back-end systems) into the local persistency database may be supported. For an application sitting on top of OAL layer 140, the source of the data may be completely transparent, which may assist in keeping application logic stable since the application is, at least for the most part, not affected by underlying systems. In one embodiment OAL 140 includes extensions to document management or content management that allow business objects to use the functionality for documents.

In one embodiment OAL 140 includes extensions to document management or content management that allow business objects to use the functionality for documents. For example, taxonomies for business objects, transparent indexing of TREX for structured and unstructured objects, and subscription services for dependent objects independent of the repository where the objects reside may be provided. OAL 140 may also provide transaction support, in as far as the transaction concept is also supported by concerned source systems, a metadata interface, allowing an application to be dynamically configured at run-time, and subscription services (e.g., J2EE publish and subscribe).

OAL 140 may have a variety of features, for example, by making the origin of data transparent to the application logic and UI to keep the application logic and UI stable. Thus, there may be little to no impact of the underlying information technology (IT) system landscape on the application logic or UI, because OAL 140 handles adaptation to the specific landscape. Furthermore, the abstraction provided by OAL 140 can prevent changes to enterprise base systems 180, such as KW and XI, from having a direct influence on the application logic or the UI. Thus, the underlying functionality may be changed without affecting the application logic or overall user interface experience.

Additionally, OAL 140 may accelerate composite application development. In one embodiment business objects are reused across composite applications, avoiding redevelopment of functions already developed, and potentially avoiding the need to port to a new environment. Example of reuse and development acceleration may include reusing enterprise base systems 180 access services (e.g., KW, XI) across composite applications, reusing know-how (e.g., uniform interface structure providing common access to business objects), efficient (e.g., model-driven) implementation of business objects based on a repository, and/or using a relative homogenous structure for application logic, which simplifies modifications and maintenance.

Additionally, OAL 140 may enable integration. Integration may be facilitated by communication between composite applications via a shared object model, shared contexts across composite applications based on a shared object model, and integration of enterprise base system (e.g., KW and BW) via a composite application object model. The integration may also involve integrating business objects.

Additionally, OAL 140 may facilitate application building by configuration. Application building by configuration can be accomplished by providing standard interfaces with well-defined semantics, which allows components to be combined in a meaningful way since the semantics of the components' interfaces is known, and allowing objects to participate in a collaborative context, (e.g., chat room) just by implementing certain interfaces.

Service layer 150 provides services for business objects in OAL 140. In general, services for business objects are common procedures that users need to interact effectively with the objects. Service layer 150, for example, may include generic services 152, collaboration services 154, guided procedure services 156, a container for application services 158, and/or other services not depicted in FIG. 1. Thus, a service layer 150 may be more or less complex than what is shown, and may include multiples of a particular type of service, and other services not shown. By separating the services from the business objects, the services may be more readily reused across business objects. In one embodiment service layer 150 provides integration of external services.

Generic services 152 provide one or more standard services for parts of an application. A standard service may refer to traditional services, as well as services that are useful to more than one application. Generic services 152 may also provide namespace and packaging concepts. Generic services 152 are typically not bound to a portion of an application, but are available to all portions. Examples of generic services 152 include print services, value help services, authorization, personalization, and voice enablement. An example of a value help service is the filling of drop down boxes in user interfaces; the service is able to determine what the possible entries are for boxes and to populate the boxes therewith.

Collaboration services 154 represent one or more services to provide the ability to link semantic objects to business objects. Semantic objects typically provide a set of generic services, like classification, notification, subscription, feedback, search, retrieval, rating, time-based publishing, state-based publishing, and security model. In addition, relations between semantic objects may be supported. For example, a team could be assigned to a task, and people could be assigned to the team. Moreover, a room could be created for the task, to keep people and documents together. Semantic objects such as document, folder, room, task, meeting, user, and discussion may be accessible via OAL 140. Semantic objects may also be available in a variety of other ways. For example, semantic objects may be included in OAL 140 as business objects and/or service, and/or individual services of semantic objects may be included in service layer 150.

Collaboration services 154 extend the semantic object concept by making the functionality of semantic objects available for business objects (e.g., notification, subscription, etc.). Thus, collaboration services 154 provides collaboration context for a business object. Collaboration services 154 may automatically manage the relations between business objects and semantic objects. In addition, new kinds of relations may be supported: for example, relations between business objects and semantic objects. Thus, a task or a team may be assigned to a specific product, people may be assigned to the task, and so on. Furthermore, special collaborative services may be provided for semantic objects, such as scheduling and assignment functions for tasks and inviting, splitting, and closing functions for discussions. In particular implementations, a suite of collaboration services may be provided without the need to deal with KM specific. These services may also be made available for composition applications. Furthermore, the relation between the business objects and the semantic objects may be maintained. The collaboration provided by collaboration services 154 may be semi-structured processes. A common understanding of a business process may be reflected by a predefined collaboration scenario. On the other hand, the business process may be adaptable to different enterprise's needs. To support this, differing scenarios may be built with minimal programming.

Guided procedure services 156 allow business objects to participate in guided procedures. A guided procedure is a series of steps, which may involve human interaction and can be performed during the execution of a composite application. A guided procedure may be considered to be a type of workflow. A guided procedure may be common to a variety of applications and, thus, may be reused. To provide guided procedures, guided procedure services 156 may provide pre-defined building blocks for process workflow and pre-defined actions. Additionally, guided procedure services 156 may facilitate template design. This may be used to support role-based collaborative processes, process workflow, and/or context definition. At run-time, guided procedures may be implemented by using template instantiation, by design-time integration for ad hoc adaptation of templates, and procedural navigation and integration in a Universal Worklist (UWL). Furthermore, guided procedure services 156 may provide context awareness and sharing by context mapping of building blocks, business object integration, and user assistance. Additionally, guided procedure services 156 may provide monitoring and analysis of guided procedures.

Application services container 158 can be used to implement model specific services for one or more business applications. Although generic objects, generic services, and/or processes may be generated for an application, some business logic is too specific to be implemented generically. For example, determining the number of vacation days that an employee has may involve determining the number of vacation days the employee is entitled to per year, determining the number of days available based on the employee's service to date for the year, determining how many days the employee has been absent to date for the year, and determining whether to assign those days to vacation days or sick days. Furthermore, if the employee is splitting time between departments, an allocation may need to be made between the two. As another example, an order process at a manufacturer may include obtaining an order, splitting the order into components based on the bill of materials, determining whether each component is in stock, if a component is not in stock, determining where and/or how to procure it, and, if a component must be procured, determining a potential delivery date. The business logic for such tasks may be difficult to model generically, especially across a wide variety of industries. Thus, the logic may be specifically coded to the specific task(s). Container for application services 158 provides one or more interfaces for the task-specific code to be used. The interfaces may be generated by the metadata of the service model, with the inner code individually or specifically programmed for the particular task. Also, maintaining the service definition in the design-time allows generation of an empty service.

The UI layer includes UI framework 160 and visualization agent 162, which will be discussed briefly here, and in more detail below. UI framework 160 provides user interfaces that allow a user to interact with composite applications. In particular implementations, UI framework 160 provides pattern components, such as, for example, a dashboard, a search bar, a browse and collect function, an object editor, and phases for a guided procedure, as building blocks for user interfaces. UI framework 160 may also decouple application logic from the UI, for example, by having a separation of the business objects of OAL 140 and application services of services layer 150, from the user interface elements of UI framework 160. The separation or decoupling can provide for the reuse of UI components in different application contexts. The decoupling can also enable business objects and application services to be visualized differently according to the specific equipments of a certain use case.

In one embodiment UI framework includes visualization agent 162 to provide visualization and/or other presentation of data/information and/or service options to a user. Visualization agent 162 may generally be described as providing the combinations of various presentation methods based upon the various navigation, working context, and/or data types, as described above.

UI framework 160 may also leverage the metadata information on business objects and services through metadata-driven UI-generation and configuration. The metadata approach allows for ready adaptability to alternative screens depending on the end users needs (e.g., in different industries). UI framework 160 may additionally allow integration (e.g., binding) into OAL 140 to access business objects, business services, and metadata. Thus, UI components may be connected to business objects or other base systems through OAL 140. UI framework 160 may support any appropriate type of user interfaces, such as, for example, a user interface composed of pattern-based components and/or freestyle components with interfaces to the user interface components or JAVA SERVER PAGES (JSPs) from SUN JAVA SERVER PAGES (JSPs) available from SUN MICROSYSTEMS, INC., of Santa Clara, Calif. UI framework 160 may also support a JAVA front-end and ABAP back-end, a JAVA front-end and JAVA back-end, or any other appropriate combination of front-end and back-end. The framework may additionally provide a construction kit for complex components and applications and configuration of patterns via XML, URL, or other appropriate technique.

Framework 100 may be connected to application database 170, which may provide a central repository for available business objects. An example of data in application database 170 includes database tables for a business object. The data may be added to, changed, and/or deleted. Data may also be stored in KW, BW, or an XI system. As discussed, framework 100 provides a set of standard services that enables application developers to make use of the data. The origin of the data and/or its persistency may be transparent to the application developer, not to mention the composite application.

Figure 2:
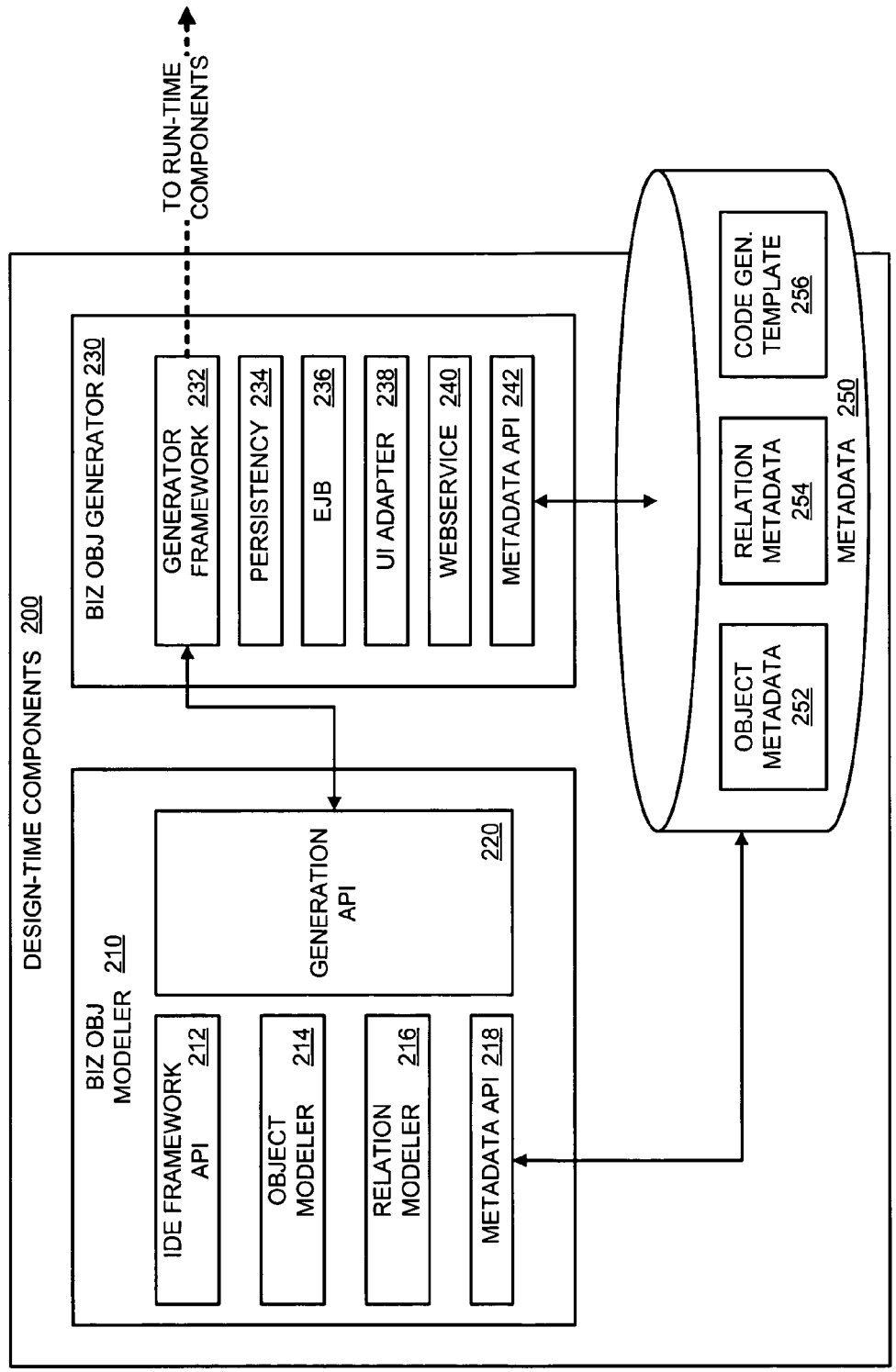
FIG. 2 is a block diagram of an embodiment of design-time components of a composite application framework.

FIG. 2 is a block diagram of an embodiment of design-time components of a composite application framework. Design-time components 200 provide one example of design-time components 110 of FIG. 1. Design time components 200 include business object modeler 210, business object generator 230, and metadata repository 250. Metadata repository 250 can also be considered, at least in part, a run-time component.

Business object modeler 210 may include various components, for example, Integrated Development Environment (IDE) framework application program interface (API) 212, object modeler 214, relation modeler 216, and metadata API 218 to access metadata repository 250. Fewer components than what are shown may be included in one embodiment of the invention, and more complex variations are also possible, including components not necessarily shown. IDE framework API 212 allows object modeler 214 to be integrated into an IDE (e.g., an ECLIPSE IDE), which supports the modeling of the business object by object modeler 214. For example, the integration may support generation of business objects as EJBs, interfaces for application services, default user interfaces, data access logic, and persistency. Relation modeler 216 allows the modeling of relations between modeled objects. For example, a sales order could consist of a customer, a product, and a price. Relation modeler 216, therefore, could provide for the modeling of the relations between these items. In operation, for instance, if a user interface is generated for a sales order, the semantics for each field in the sales order may be identified. Additionally, a connection to the value help function may be facilitated. Metadata API 218 enables business object modeler 210 to store and access business object metadata in metadata repository 250 and relation modeler 216 to store and access business object relation metadata in metadata repository 250.

Business object modeler 210 also includes generation API 220, which allows a business object to communicate with generator framework 232 for code generation, and providing the generated code to a run-time environment.

Business object generator 230 can include generator framework 232, persistency generator 234, EJB 236 generator, UI adapter generator 238, Web service generator 240, and metadata API 242. Generator framework 232 may also be integrated into the IDE accessed through IDE framework API 212.

To generate a business object, business object generator 230 may use templates in metadata repository 250 and code them with object metadata and relation metadata in the repository. Business object generator 230 may also generate the data persistency for the business object, and generate the actual business object (e.g., an EJB). Business object generator 230 may additionally generate user interfaces for the business object and any necessary Web services. Templates used by business object generator 230 may be generic. In one embodiment the various generation components automatically create JAVA classes (e.g., for the implementation of the object access layer), JDO tables, EJBs, and configuration files, to adjust UI patterns to a certain business object, for example. Thus, the connectivity to back-end systems and the composite application persistency is generated as well as a default User Interface. Furthermore, UI adapters for a UI development and interface module and, if necessary, Web services may be generated. The output of such a process may be real working code in the object access layer of the run-time components.

In one example, business object generator 230 generates a run-time implementation of a business object in an object access layer. Business object generator 230 reads the business object metadata from metadata repository 250 and generates JDO persistency, connectivity to an XI, a KW and/or a BW (e.g., by using proxies), generates generic methods, and a basic UI. For this coding, templates (e.g., for services) or XML-templates (e.g., for JDO persistency) are used where business object specific coding or XML is added, and the result is stored as complete code or complete XML.

Metadata repository 250 may include various items of data, including, but not limited to, object metadata 252, relation metadata 254, and code generation templates 256. The information in object metadata 252 and relation metadata 254 may be used to code templates 256 to generate a business object.

Figure 3:
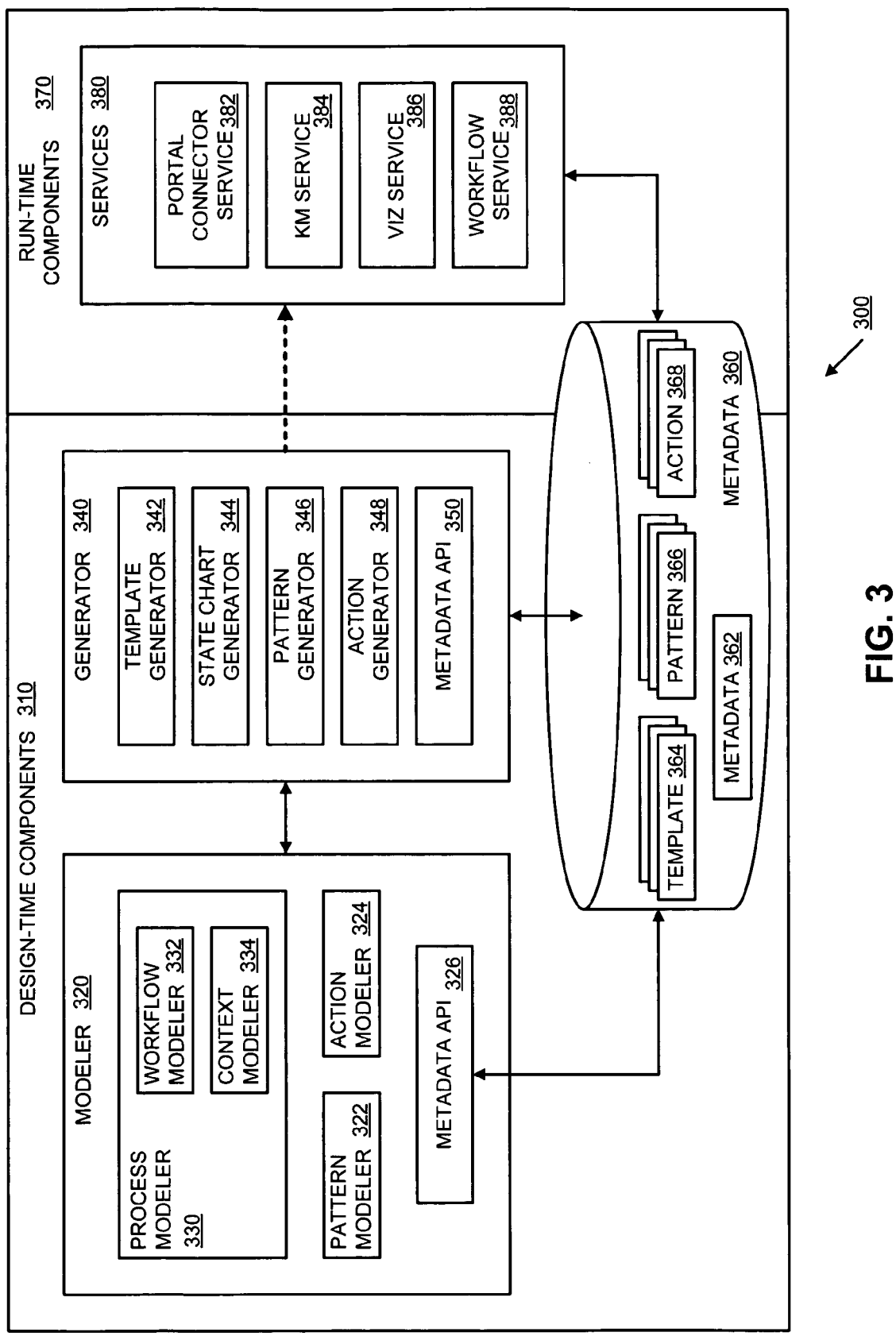
FIG. 3 is a block diagram of an embodiment of guided components for a composite application framework.

FIG. 3 is a block diagram of an embodiment of guided components for a composite application framework. As mentioned previously, a guided procedure is a series of operations/functions/performances, which may involve human interaction, which can be performed during the execution of a composite application. A guided procedure may be common to a variety of applications. Components 300 may be classified into design-time components 310 and run-time components 370. Metadata repository 360 may be part of, and/or interact with both design-time components 310 and run-time components 370. Design-time components 310 may be used to generate run-time components 370. Design-time components 310, run-time components 370, and metadata repository 360 are examples of similarly-named components described previously.

Design-time components 310 include modeler 320 and generator 340. Modeler 320 includes process modeler 330, pattern modeler 322, and action modeler 324. Process modeler 330 includes workflow modeler 332 and context modeler 334. Workflow modeler 332 allows process workflow for a guided procedure to be modeled, and context modeler 334 provides context definition. That is, context modeler 334 allows relations between other processes to be defined. For example, an application may have more than one way of being activated, for example, Intranet Web-based form versus remote voice control. Context modeler 334 can provide for both activation mechanisms to be associated with the application. Pattern modeler 322 provides workflow patterns (e.g., delegation, approval) for workflow modeler 332, and action modeler 334 provides actions for workflows. Modeler 320 also includes a metadata API 326, which provides access to the data in metadata repository 360. Thus, access to metadata regarding guided procedures can be provided.

Generator 340 includes template generator 342, state chart generator 344, pattern generator 346, action generator 348, and metadata API 350. In one embodiment templates describe a workflow that may be may be implemented using workflow patterns. Workflow patterns may contain actions that define the workflow and therefore, part of the template. Thus, a pattern may be viewed as an abstraction of an action, and a template may be viewed as an abstraction of work flow pattern. For example, a template could describe a workflow for ordering a product (e.g., a computer). The template may specify a workflow pattern for obtaining manager approval. The pattern could have certain actions that need to be undertaken to complete the workflow. An example of an action could be finding the names of the employee's managers. The approval pattern, moreover, could be used for different templates.

Template generator 342 generates templates, state chart generator 344 generates state charts, pattern generator 346 generates patterns, and action generator 348 generates actions for the run-time environment. Metadata API 350 provides access to the metadata in metadata repository 360. Metadata repository 360 can include one or more templates 364, one or more workflow patterns 366, one or more actions 368, and/or other metadata 362. The templates, patterns, actions, and metadata may be accessed by generator 340 to produce a guide procedure. Other information may be found in metadata repository 360, and metadata repository 360 does not necessarily include all the items represented in the figure in all embodiments.

Run-time components 370 provide instantiation for guided procedures, producing instances of application portions. In one embodiment procedural navigation and integration may be provided in a Universal Worklist (UWL). Run-time components 370 may include various services, for example, portal connector service 382, KM service 384, visualization service 386, and/or workflow service 388. The services depicted in FIG. 3 are merely representative, and are not to be understood as necessary or restrictive of the type of services possible. For example, run-time components 370 could also include one or more of object access services, context sharing service, content services, and metadata services.

Object access services can allow objects in an object access layer to be accessed. Context sharing service can provide context to a workflow. For example, when a user accesses a workflow, a context sharing service can provide a link to the proper portions of the workflow. For instance, many workflows involve inboxes, where new tasks for the workflow may be sent. The inbox may provide a link to the proper portion of the workflow if the context is known. Content services can provide services for executing functions based on generic calls. For example, a workflow may need an application (e.g., a composite application, an HRM application, a CRM application) to be initiated. By making a generic call to content services, the application may be initiated. Content service may support integration with an application and/or a user interface.

Portal connector service 382 can provides a connection service to a portal. KM service 384 can provide a connection service to a KM module. Visualization service 386 can provide functionality to a visualization agent. For example, various combinations of visualization and/or other presentation of data may be possible based on a work mode of a user. The manner in which the data and interaction of the various services for the user is made can be controlled/managed via one or more visualization services 386. Workflow service 388 can provide a connection service to an ad-hoc workflow. This workflow may be very user-centric, allowing the assignment of not only tasks handled by transactions in business systems, but also tasks that require user handling (e.g., compose e-mail).

Components 300 may have a variety of features. For example, the components may provide context mapping for building blocks, and a user profile may be automatically used and updated. In certain implementations, ad-hoc administrations of running workflows may be supported and guided procedures may be monitored and analyzed.

Figure 4:
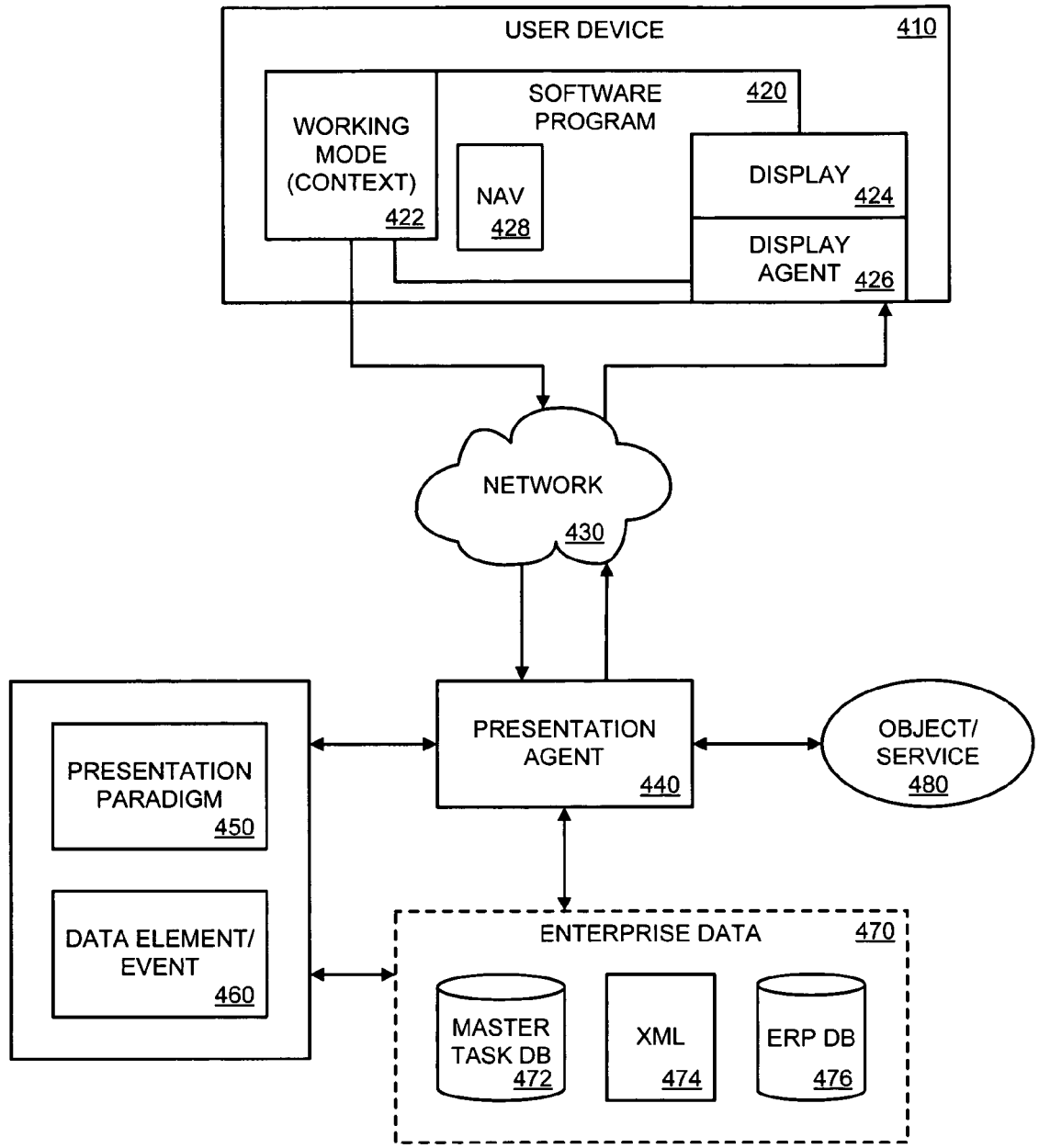
FIG. 4 is a block diagram of an embodiment of a system having a presentation agent.

FIG. 4 is a block diagram of an embodiment of a system having a presentation agent. User device 410 represents any number of devices that may be a client of an enterprise system. For example, user device 410 may be a laptop or desktop computer, a portable computing device, etc. User device 410 executes software program 420, which may be considered to be, or to provide a working environment or work context. The working environment or context is represented as working mode 422. Working mode 422 may include information about software program 420 or a document or process provided by software program 420. Working mode 422 may include any of the various working modes described above.

Software program 420 may also include one or more navigation methods (nav) 428, which represent any of the navigation mechanisms discussed above. Navigation method 428 may be provided from software program 420, from another program on user device 410, from a host operating environment (e.g., including an operating system) of user device 410, and/or may be provided over network 430 from the enterprise system. Navigation method 428 provides a manner of accessing processes, data, etc., from the enterprise.

User device 410 interconnects with the enterprise system via network 430, which represents interfaces, connection points, ports, etc., necessary to provide a connect from user device 410 to the enterprise system. Network 430 may include wired and/or wireless connections to user device 410. In one embodiment the enterprise system to which network 430 is connected is provided with the NETWEAVER platform available from SAP of Walldorf, Germany. In one embodiment the enterprise system issues a request to user device 410 to determine working mode 422. With knowledge of working mode 422, the enterprise system may provide a personalized working experience for a user.

The enterprise system may include presentation agent 440, which represents one or more components or modules (software and/or hardware) to provide the customized enterprise-level access to user device 410. In one embodiment presentation agent 440 is not a single entity (either software or hardware), but may represent several functions of various components and/or services of the enterprise system that provide the features of data navigation and presentation discussed herein. Presentation agent 440 may have, or access presentation paradigm 450 and/or data element/event 460.

Presentation paradigm 450 represents one of various manners/methods/forms of presenting data to user device 420, and may include any of the presentation paradigms discussed above. Presentation paradigm 450 may be associated with working mode 422, in that a particular working mode 422 may match a presentation paradigm 450 as determined by a developer of software program 420, a developer of the information/data to be presented, or preferences associated with a user of user device 410, or a combination of these. In an alternate embodiment presentation agent 440 determines a presentation paradigm 450 well-suited to presenting the information desired to present to user device 410.

Presentation agent 440 may access data element/event 460, which represents any of the data items discussed previously, and may be selected from among any data, object, process, project, etc., available within enterprise data 470. In one embodiment presentation agent 440 takes the data or event type into consideration in determining what presentation paradigm 450 to use to present data to user device 410. Thus, any combination of data and presentation paradigm and working mode may be possible, and the system can select particular combinations determined to be better suited to providing a useful working context to a user. In one embodiment presentation agent 440 takes into consideration navigation method 428 in determining what presentation paradigm 450 to use to present data to user device 410. Thus, any combination of the above may also be combined in any combination of navigation method to present data accessed by user device 410.

Presentation agent 440 may access enterprise data 470, which represents any information, process, or data available from the enterprise. Modern systems can allow enterprise data 470 to be seamlessly integrated despite actual, physical location of the data. For example, a company with locations in various countries may have information available from multiple locations throughout the world, which are all available to user device 410 without regard to physical location of the data or the user device. Additionally, enterprise data 470 may include data external to a particular enterprise (e.g., a trading partner). In one embodiment enterprise data 470 includes one or more of master task database 472, which provides information regarding one or more projects, XML source 474, which could represent dynamically generated information, and/or enterprise resource planning (ERP) database 476, which represents any data that may be considered part of a data store of information used in coordinating or working on enterprise-level processes or projects.

In one embodiment presentation agent 440 may access one or more objects 480, which represent elements of an enterprise system that enable the integration of enterprise data 470 and/or the interconnection with user device 410 and/or provide features to enable presentation agent 440 to provide combinations of presentation methods with methods and conditions of access to data. The methods of access may include the navigation methods, and the conditions of access may include the working mode. In one embodiment object 480 represents one or more JAVA beans of the enterprise system. In one embodiment presentation agent 440 is one or more object 480 of the enterprise system.

Figure 5:
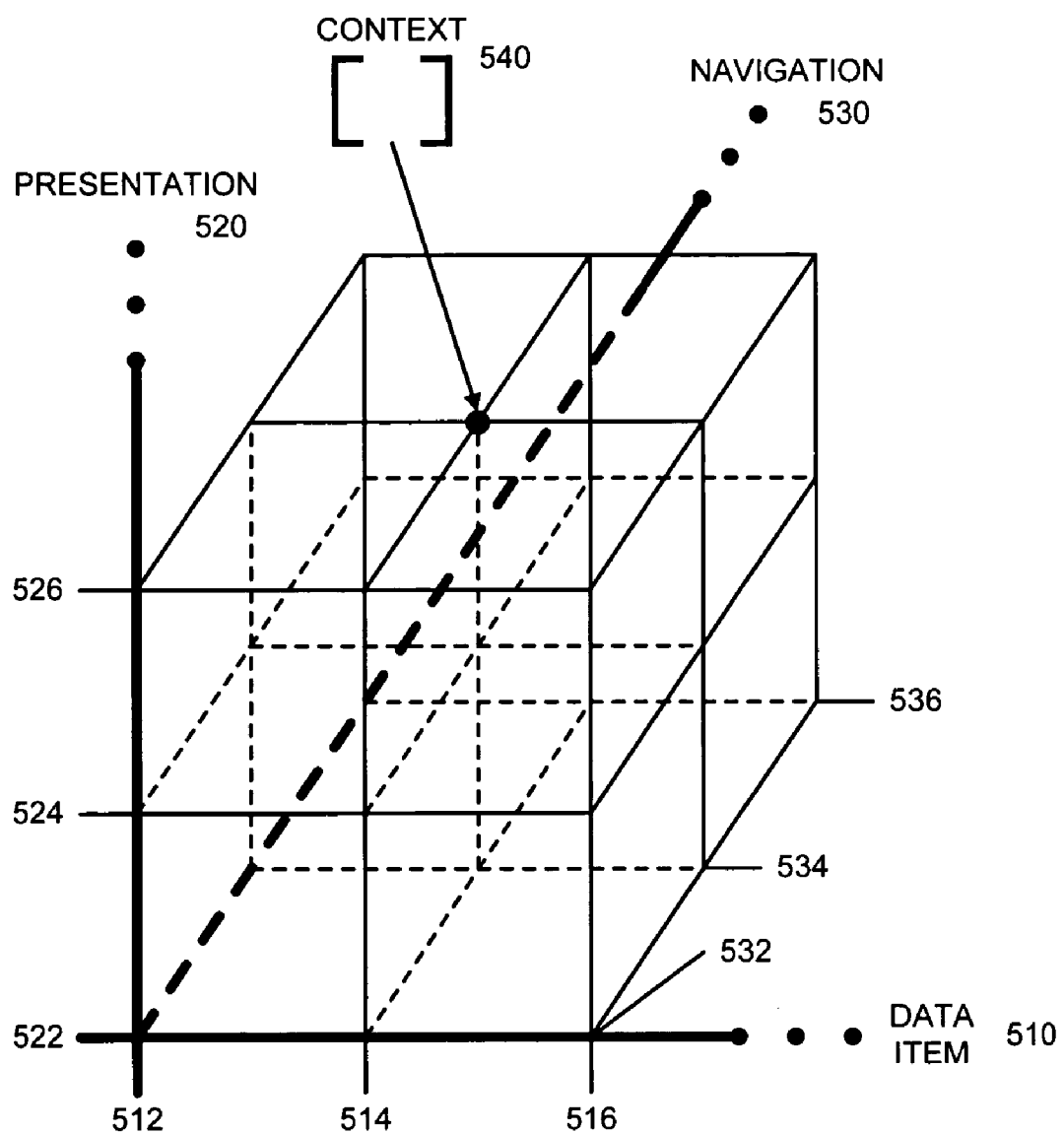
FIG. 5 is a block diagram of an embodiment of a data presentation matrix.

FIG. 5 is a block diagram of an embodiment of a data presentation matrix. The matrix represents in a contextual way the possible combinations presented herein. The three-dimensional axis represents three dimensions, or vectors of possible combination. The x-axis is shown as a data item axis 510. Data item 510 may include any data item mentioned above as enterprise data. The y-axis is shown as a presentation axis 520. Presentation 520 may include any method or paradigm of presentation mentioned above. The negative z-axis is shown as a navigation axis 530. Navigation 530 may include any method or mechanism of navigation mentioned above. Each of these three axes are shown having three elements each, 512, 514, and 516, 522, 524, and 526, and 532, 534, and 536, respectively. The matrix of possible combinations can be of whatever size is supported in a system, whatever size is allowed by an application or software program, whatever is provided within user preferences, etc. Thus, an axis may have fewer than three elements, or more, making any number of combinations possible.

In addition to the axes, FIG. 5 is shown with a point of intersection on the graph, representing a context vector 540. Context 540 may include any of the working modes mentioned above. In one embodiment context 540 represents that a particular combination of data items 510, presentations 520, and navigations 530 can be supported for a particular working mode. In another embodiment, context 540 has multiple possibilities, providing a fourth dimension of combination for different possibilities. Context 540 may thus also be of any size, relative to the matrix of possible combinations of whatever size is supported in a system, whatever size is allowed by an application or software program, whatever is provided within user preferences, etc.

Figure 6:
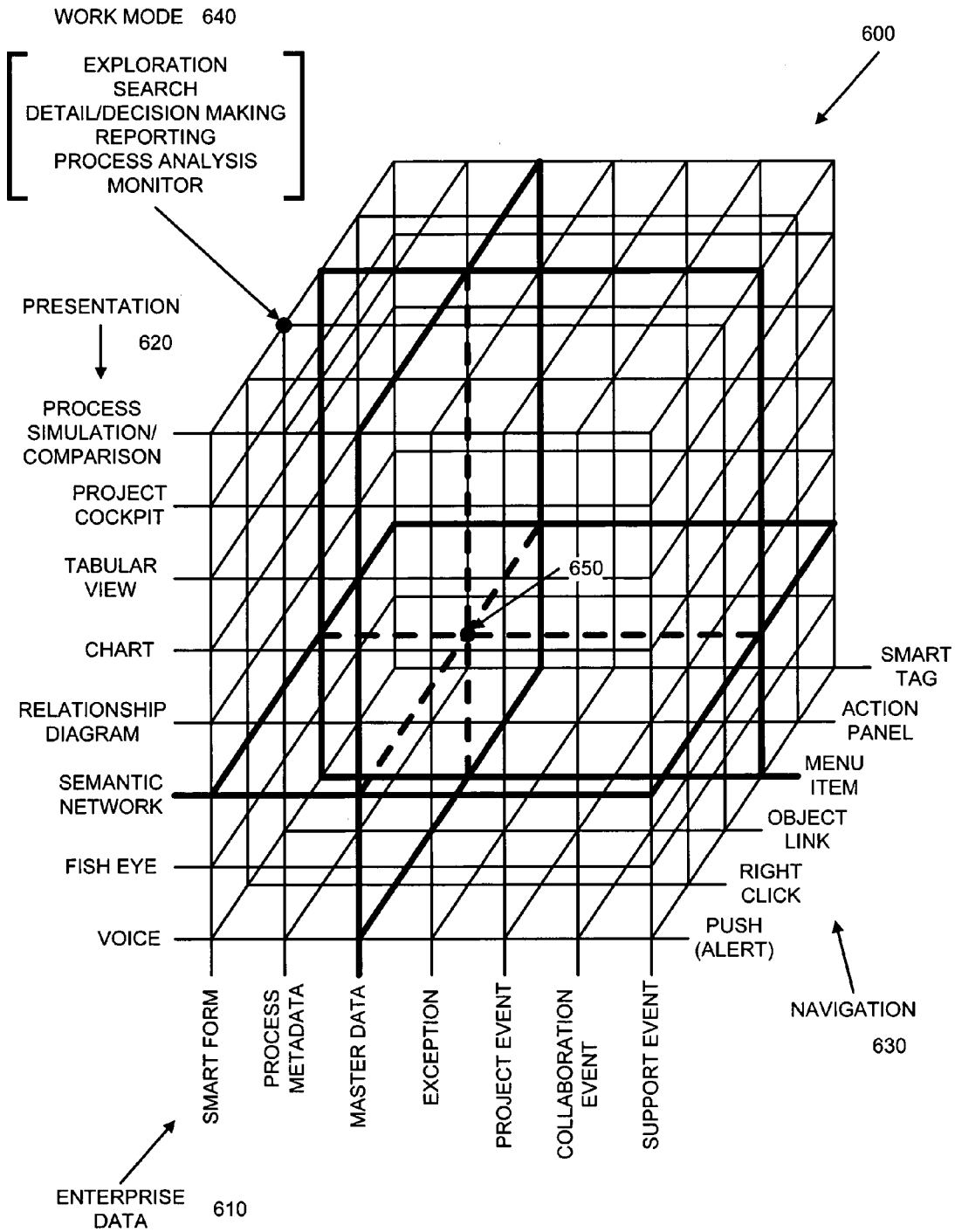
FIG. 6 is a block diagram of another embodiment of a data presentation matrix.

FIG. 6 is a block diagram of another embodiment of a data presentation matrix. FIG. 6 provides one example of a matrix of possible combinations according to FIG. 5, with specific possibilities referenced on the graph. Enterprise data 610 may include smart forms, process metadata, master data, exceptions, project events, collaboration events, and support events. Presentation 620 may include voice or audible presentation, fish eye view, semantic network display, relationship diagram view, chart view, tabular view, project cockpit view, and process/simulation comparison view. Navigation 630 may include push event, right clicks, object links, menu items, action panels, and smart tags. Work mode 640 may include exploration, search, detail/decision making, reporting, process analysis, and monitor modes. Other options for any or all of the various dimensions are also possible.

Matrix 600 includes highlighted sections to provide one example of a combination that might be possible with a system as described herein. Consider an exploration work mode 650. A menu item navigation 630 may be provided to a user to access master enterprise data 610. A presentation agent may use work mode 650 and derive semantic network presentation paradigm 630 with which to display the master data to the user. Thus, the intersection of the three dimensions with the selection of one of the work modes provides one combination of data presentation. In another embodiment the user may select another menu item from a menu option, which may change work mode 650 to a search operation mode for master data. In one embodiment presentation 630 may remain as a semantic network. Alternatively, the change may cause the presentation agent to change to another form of presentation, for example, tabular view. In general, any such combination is possible.

Figure 7:
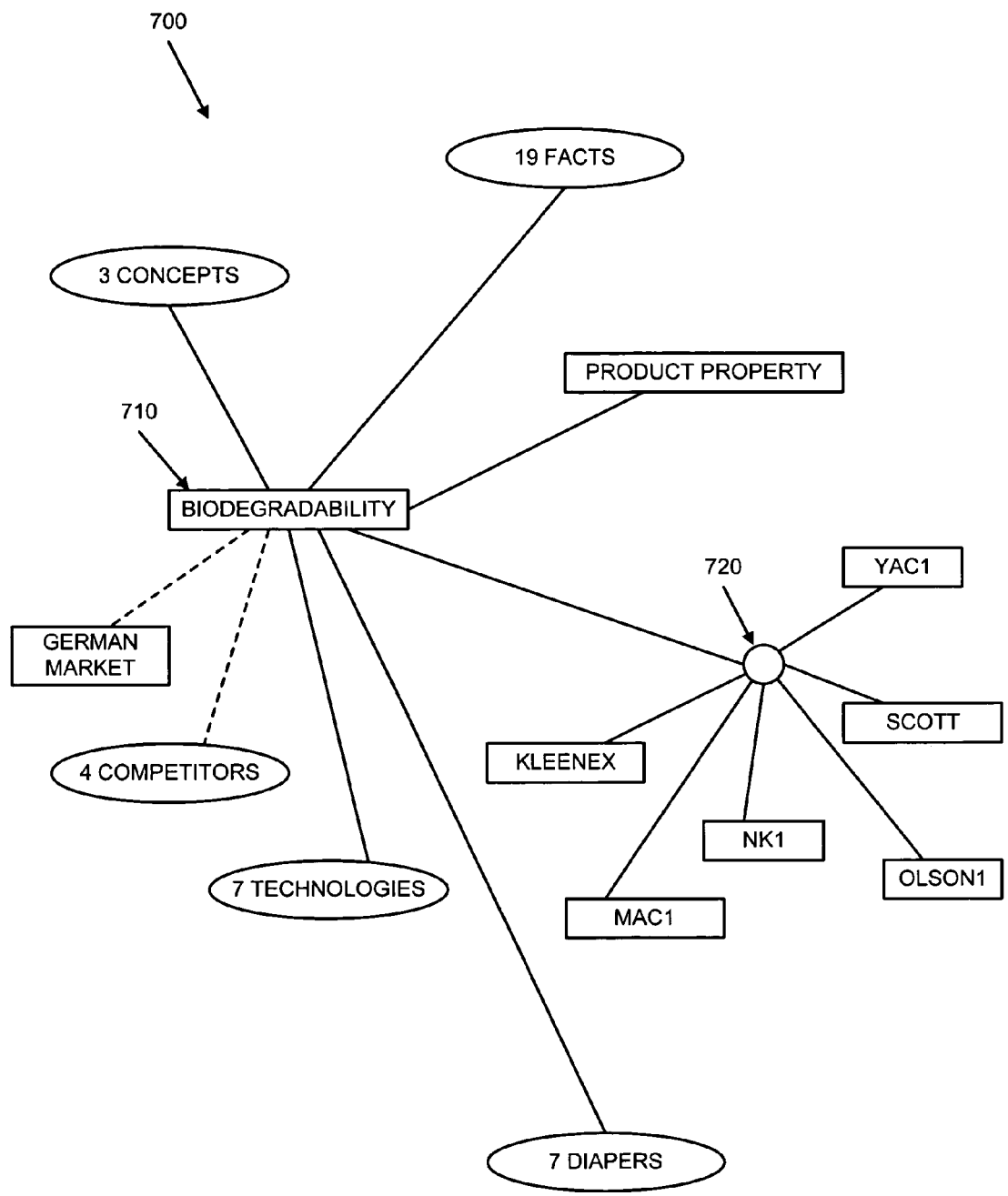
FIG. 7 is a block diagram of an embodiment of a hyperbolic view diagram.

FIG. 7 is a block diagram of an embodiment of a hyperbolic view diagram. Consider a system in which a user desires to see high amounts of relatedness data. An exploration working mode may cause a presentation agent to provide information in a hyperbolic relatedness browser to provide a high ability to the user to browse large amounts of related data. In one embodiment FIG. 7 represents a navigational method 700, which offers smart tag 710 to a hyperbolic relatedness browser that allows an accessing user to start relatedness browsing from within an office document. Smart tag 710 is labeled "biodegradability" within the representation of FIG. 7. Any expression or concept could be similarly tagged.

If a user clicked on or selected smart tag 710, the biodegradability topic may expand into all the related connections of information. In one embodiment smart tag 710 includes a connection to node 720, which may contain a subgroup that is shown expanded. The node is merely illustrative, and other representations will have no nodes or multiple nodes. In one embodiment node 720 will be shown with a topic name. In another embodiment (as shown here) the topic name is hidden. The user could perform an action or initiate a function, for example, performing a mouse-over of node 720, to display the topic name. In one embodiment the user could click on node 720 the subgroup closes again, back into the node view.

In one embodiment verbs in a productivity document express a type of working mode, and include links to smart tags from among which the user can click to choose which working mode to use. For example, if a user clicks on a tag labeled "Search for support cases for these items," a search operation work mode can launch with the search scope already set for either searching for support notes, or searching for a particular item. In this way a user can also type in a specific key word, and the system can automatically generate links to related data to be accessed from the context or program in which the user is operating. A hyperbolic relatedness browser, such as that shown in FIG. 7, can also be used with smart tag links to project or process data.

As earlier mentioned, the underlying process data can be derived from already existing relationships in structured data in the ERP system. The various process topics/data could actually be viewed in any type of miniaturized customary analytical view (e.g., an EXCEL spreadsheet), or in a unique combination of visualizations (e.g., an EXCEL spreadsheet accompanied with a meter indicator on the side to reflect the status of a selected running process). Further, any types of processes can be dynamically viewed by these methods, such as research and development processes, hiring processes, other human resources processes such as training processes (e.g., development of an employee), etc. Additionally, access to live, online data can be provided.

With the various views and links to data, the system as described herein could allow tracking or viewing all aspects of any types of relationships in a company, such as working with other companies, tracking products, dynamically viewing details of supplier relationships and customer relationships. A user can click on a smart tag, or a series of smart tags, in an enterprise histogram and receive a display similar to presentation 700 for "biodegradability" smart tag 410. However, there will be project data represented in the resulting topics and nodes. In this manner, numerous projects can be tracked, and their data compared and contrasted. Thus, reliable data can be derived from projects not only for tracking financing, but also to help in predicting progress of future projects, and/or provide information relative to deciding upon the best model and approach for a particular type of future project.

Figure 8:
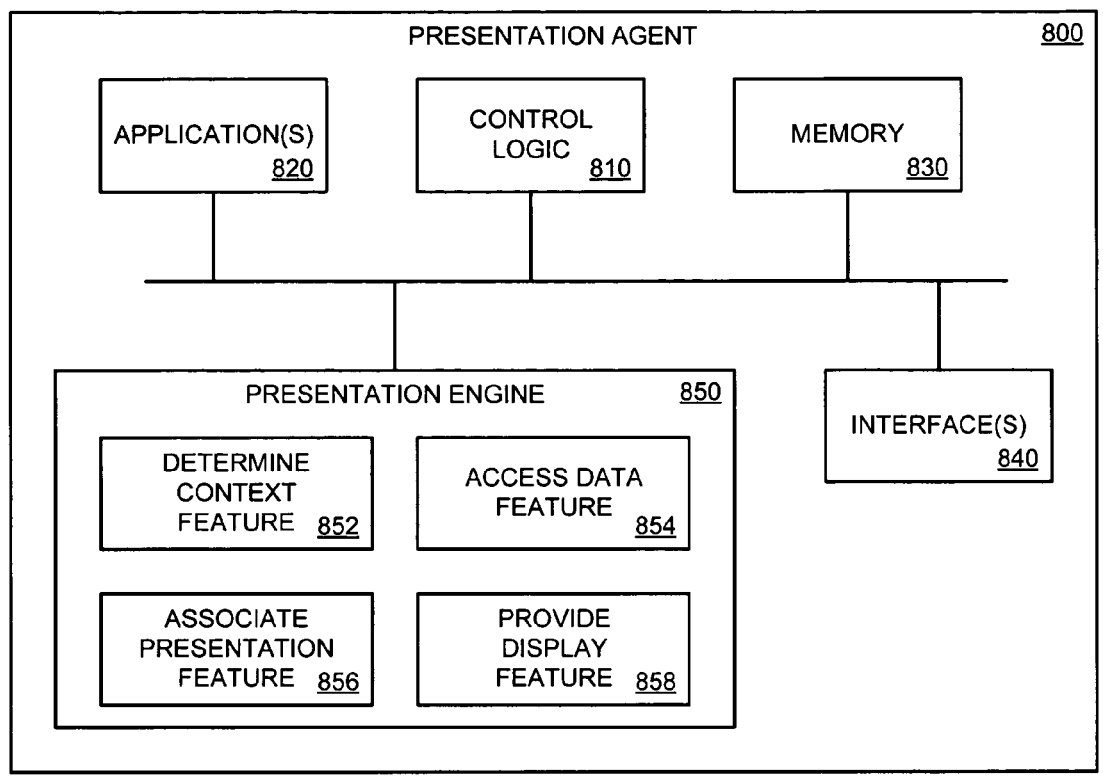
FIG. 8 is a block diagram of an embodiment of a presentation agent.

FIG. 8 is a block diagram of an embodiment of a presentation agent. Presentation agent 800 includes control logic 810, which implements logical functional control to direct operation of agent 800, and/or hardware associated with directing operation of agent 800. In one embodiment agent 800 includes one or more applications 820, which represent code sequence and/or programs that provide instructions to control logic 810. Agent 800 includes memory 830 and/or access to memory resource 830 for storing data and/or instructions. Agent 800 also includes one or more interfaces 840, which represent access interfaces to/from agent 800 with regard to entities (electronic or human) external to agent 800.

Agent 800 also includes presentation engine 850, which represents one or more functions that enable agent 800 to provide enterprise data with various combinations of presentation paradigms. The functions include one or more of determine context feature 852, access data feature 854, associate presentation feature 856, and provide display feature 858. Other features may be included, making other versions of presentation engine 850 that are more or less complex than what is shown in FIG. 8.

Determine context feature 852 enables presentation engine 850 to receive a work mode, and/or derive a work mode from a work environment. The work mode can be or include the work modes as described above. Determining the context may include determining what type of information is in an active software program and/or determining the type of software program that is active. In one embodiment multiple software programs may be "opened" on a user device, but one of the programs is currently in the front of the display, providing interaction with a user, and considered to be an "active program," while another program is "in back" of the active, interacting program, and is considered to be an "inactive program" for purposes of determining the work context of the client. In one embodiment a user selects a file or process for execution, and determine context feature 852 enables presentation agent 800 to determine a work context associated with the file to provide the proper visualizations upon the opening of the selected file.

Access data feature 854 enables presentation engine 850 to access the data or event selected by a user or data or event related to other data in use by a user to present to the user. Access data feature 854 may include the methods of navigation described above, to any of the types of enterprise data or events discussed above. In one embodiment access data feature 854 is not necessarily considered part of presentation agent 800, which may simply use data accessed for the user by another service, process, or module/entity. Access data feature 854 represents the fact that presentation agent 800 provides a method for viewing the enterprise data accessed for or in response to the user.

Associate presentation feature 856 enables presentation engine 850 to select from among multiple available presentation methods, and may include any of the methods described above. In one embodiment a particular presentation paradigm is associated with a particular combination of work mode and data type, work mode and navigation type, etc., or simply with a particular work mode. Associate presentation feature 856 may also include consideration of user preferences. Presentation agent 800 may include a table in memory 830 to store information relating to association of presentation paradigm with working modes, combinations of working modes with other dimensions of variability, and/or user preference. In one embodiment the association of presentation paradigm is pre-selected, and presentation agent 800 simply determines which paradigm should be used, and in another embodiment presentation agent 800 determines dynamically based on the factors mentioned above.

Provide display feature 858 enables presentation engine 850 to provide the data in the selected presentation paradigm to the user. Presentation agent 800 may provide an application extension, a function call, a link library, a program, a pointer to any of these, or an application to execute to the user. In one embodiment the user device includes a function, program, etc., that is capable of providing the selected presentation method, and presentation agent 800 simply refers to the type of visualization, which the user device is able to launch or select for operation to display the information provided.

Agent 800 may include hardware, software, and/or a combination of these. In a case where agent 800 includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above.

Figure 9:
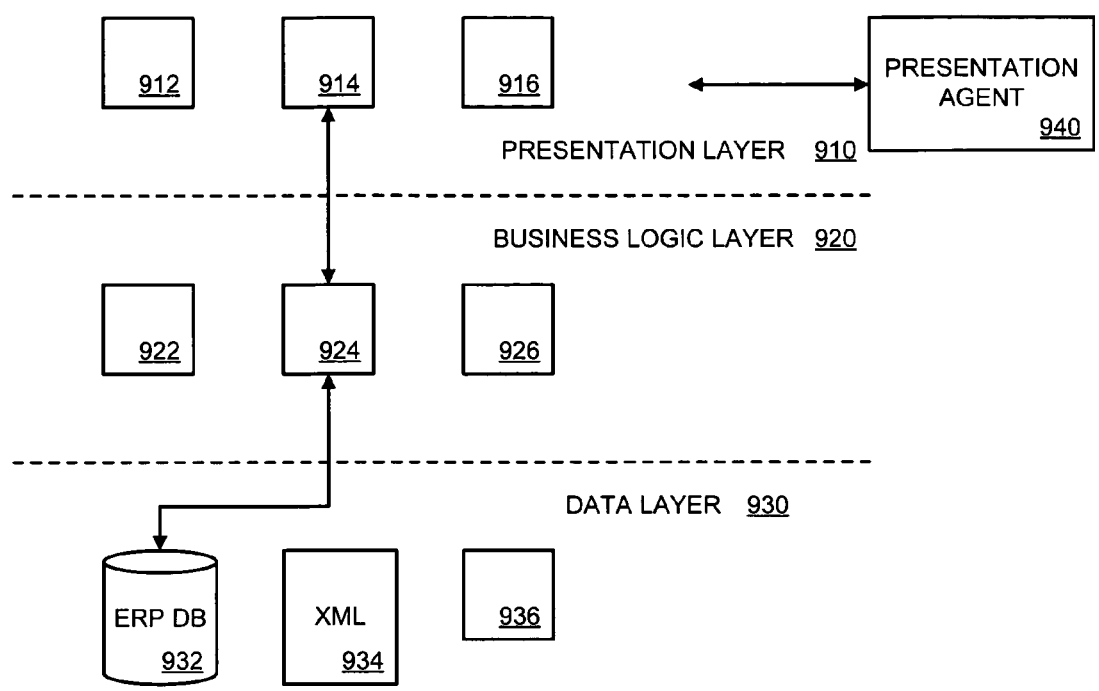
FIG. 9 is a block diagram of an embodiment of an enterprise system that provides information to a presentation agent.

FIG. 9 is a block diagram of an embodiment of an enterprise system that provides information to a presentation agent. The enterprise system may include various levels, which is understood by those of skill in the art. A simple representation of an enterprise system that can be employed as described herein is represented in FIG. 9. At the base can be data layer 930, which provides the information based for the enterprise. Data layer 930 may include any type of data source. For example, data layer 930 may include ERP database 932, XML document 934, and/or another data object 936.

Interaction with data layer 930 is provided via business logic layer 920. Business logic layer includes elements 922-926, which represent applications, enterprise JAVA beans, server clusters, C# applications, etc. Any service module or application can provide functionality to access information at data layer 930.

Interfacing with the enterprise client is provided with presentation layer 910. Presentation layer 910 include objects 912-916, which each represent a presentation mechanism, for example, a servlet. Each layer is divided by a dashed line representing the fact that each element of each layer may be located geographically near, or geographically distant, but the functionality is provided up and down the layers with the enterprise system. An example of such a system is the NETWEAVER platform employing Enterprise Services Technology (ESA). One or more elements of business logic layer 920 may be or include a service-enabled application.

In one embodiment presentation agent 940 resides at presentation layer 910, as an object of presentation layer 910, or within one or more objects. In another embodiment presentation agent 940 resides outside of presentation layer 910, and interacts with objects of presentation layer 910. For example, in one embodiment presentation agent 940 resides at business logic layer 920, either as a separate entity, or within one or more entities of business logic layer 920. Alternatively, presentation agent 940 may reside within the user's computing device, and interact with the enterprise system. Thus, presentation agent 940 may or may not be part of the enterprise system, and may exist as a module or application on the user device.

Figure 10:
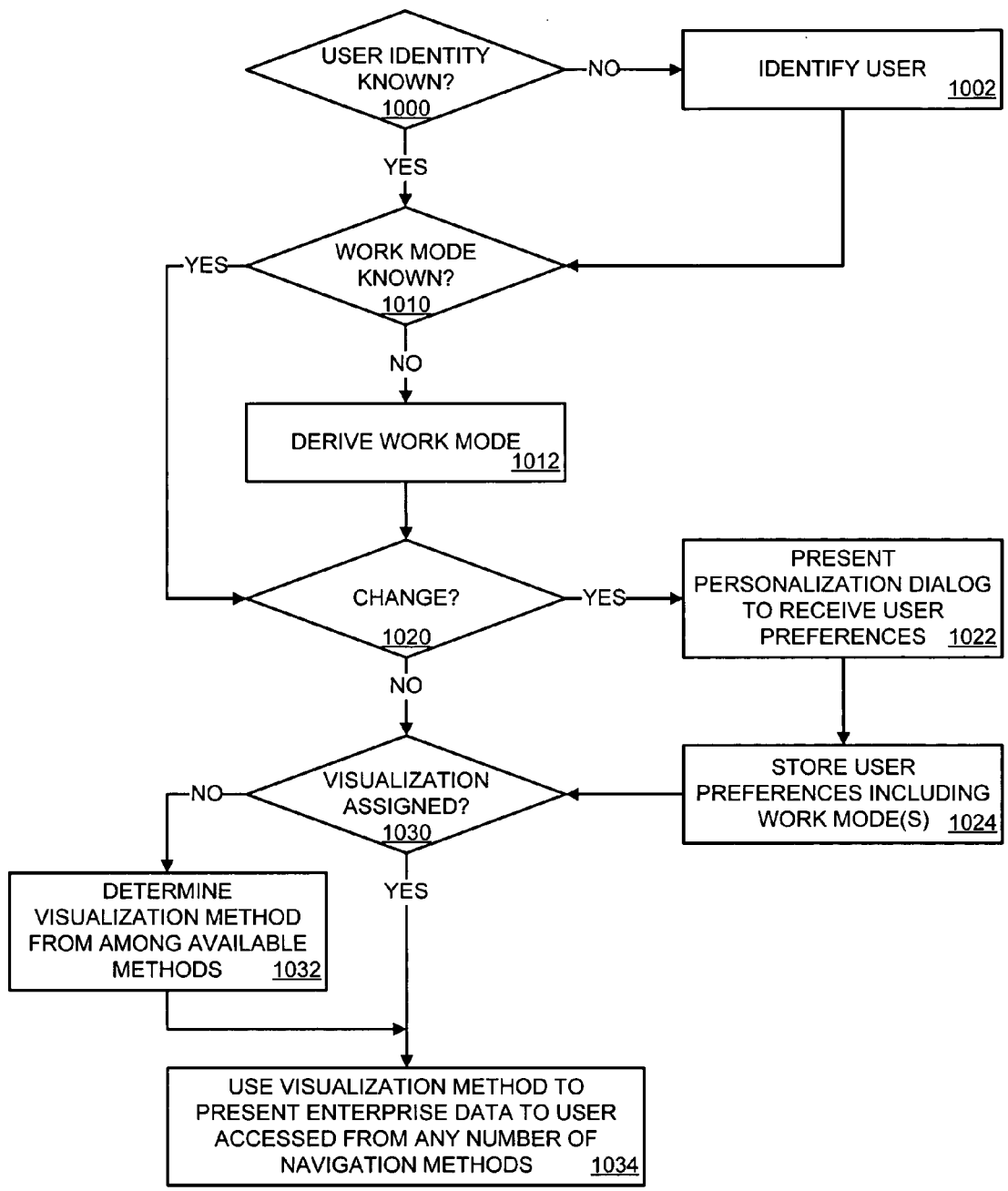
FIG. 10 is a flow diagram of an embodiment of a process to provide a visualization of enterprise data.

FIG. 10 is a flow diagram of an embodiment of a process to provide a visualization of enterprise data. The presentation agent determines if the user identity is known, 1000. Determining the user identity may be necessary if the presentation agent resides within the enterprise system, or determining and sending the user identity may be necessary for the presentation agent to interact with the enterprise. In one embodiment the presentation agent resides within the user computing device, and determining the user entity may include determining what enterprise user is logged onto the enterprise system. If the user is not identified, the presentation agent identifies the user, 1002. Identifying the user can enable the presentation agent to provide a customized work experience to the user.

The agent determines if the work mode is known, 1010. The work mode refers to the work modes described above. The work mode may have been selected by a user when starting the computing device, or when opening a file, or launching a program, or when logging into the enterprise system. If the work mode is known, the agent determines if a visualization is assigned, which will be discussed below. If the work mode is not known, the agent derives the work mode, 1012. Based at least in part on the work mode, the user will present the work environment to the user.

The agent can determine if the derived or known work mode is to be changed, 1020. Thus, a work mode can be known or derived, but the user, the work context, and/or the desired action could indicate that the work mode should be changed. In one embodiment changing the work mode can be accomplished by presenting a personalization dialog to a user to receive user preference input, 1022. The user preferences can be stored, including preferences of work modes, 1024, for future use by the enterprise system and/or the presentation agent.

In one embodiment a visualization method is pre-assigned to a work mode. While a visualization is specifically mentioned, other forms of presentation may similarly be used (e.g., audible presentation). The visualization method can be any presentation method described above. Thus, the agent may determine if a visualization is assigned, 1030. If a visualization is not assigned to the working mode, the agent may determine a visualization method to use from among available visualization methods, 1032. Determining the visualization method may include evaluating the data type requested, the work mode, the user permissions and/or preferences, etc.

Once a visualization method is selected, either by pre-assignment, or by dynamic selection, the agent can use the visualization method to present enterprise data to the user, 1034. The data can be any form of data accessed from any number of navigation methods, which include the methods discussed above.

Figure 11:
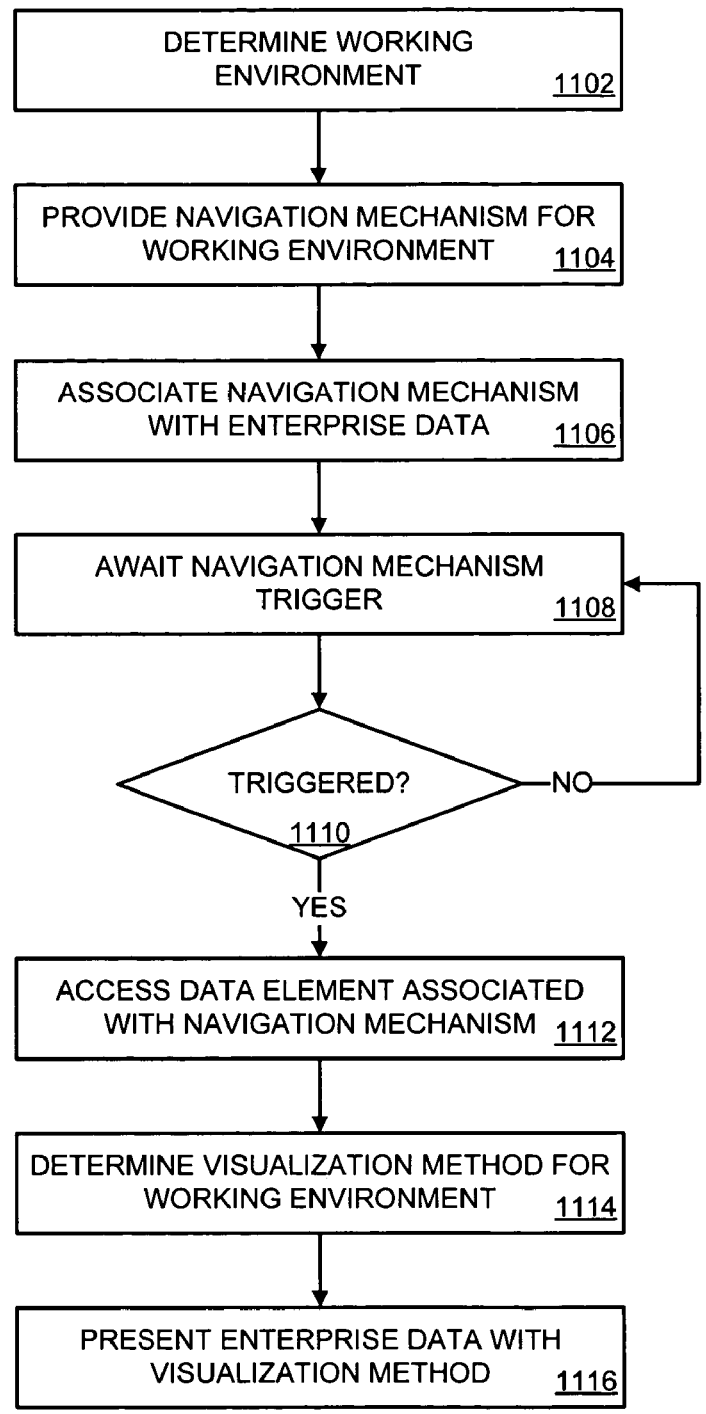
FIG. 11 is a flow diagram of an embodiment of a process to present enterprise data according to a visualization method with a navigation mechanism.

FIG. 11 is a flow diagram of an embodiment of a process to present enterprise data according to a visualization method with a navigation mechanism. In one embodiment the process of FIG. 11 works in conjunction with the process of FIG. 7. The agent may determine the working environment, 1102, as discussed previously. The agent, a software program, a software function, the enterprise system, a business layer application, etc., can provide a navigation mechanism to the user for the particular working environment, 1104. For example, in one embodiment a user may have access to different navigation mechanisms if the user is executing a productivity program of an office suite of software than if the user is accessing email. The navigation method may be any method described above. The working environment may depend in one embodiment on a software program that is in use, or selected for use. Thus, a user may select a program or file for opening, which can provide an indication of work mode or working environment. Alternatively, the program in which a user is working is considered the software program selected for execution. The determining of the working environment may be determined based on the software program and/or based on one or more functions or actions to be performed with or in the software program.

The agent, software program, or an operating system can associate the navigation mechanism with enterprise data, 1106. Thus, the navigation mechanism can be triggered or activated to access the enterprise data. Accessing the enterprise data refers to any action that can be performed with or on the data or event. Thus, a user may read, write, have a visualization rendered, execute a process, initiate a service, etc. The navigation mechanism will then wait to be triggered, 1108, to enable the associated data access.

If the navigation mechanism is triggered, 1110, the enterprise system accesses the data element associated with the navigation mechanism, 1112. The agent can determine, before, after, or in conjunction with accessing the data what visualization method to use for data to present the data in the context of the working environment, 1114. With a visualization method selected, the agent presents the enterprise data with the visualization method in the context of the work environment in use by the user, 1116.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. In an enterprise system having a presentation agent for presenting enterprise data of the enterprise system in accordance with one of a plurality of working modes selectable via a user device communicably interfaced with the enterprise system, a method comprising:

determining, via a determine context feature of the presentation agent, a working mode associated with the user device based on a user preference indicated by the user device, the working mode to affect the manner in which the enterprise data is presented to and displayed via the user device;

de-coupling, via a composite application framework of the enterprise system, one or more composite application components from an underlying one or more enterprise application platforms of the enterprise system, wherein the composite application framework provides an integration infrastructure for creating a composite application from the one or more composite application components, and wherein the one or more composite application components comprise functionality to be integrated by the composite application framework;

creating the composite application, via the composite application framework, by integrating the one or more composite application components;

associating, via an associate presentation feature of the presentation agent, a presentation paradigm with the composite application based at least in part on the determined working mode associated with the user device; and presenting, via a provide display feature of the presentation agent, the enterprise data to the user device in accordance with the presentation paradigm associated with the composite application in the context of the composite application, wherein presenting the enterprise data in the context of the composite application comprises presenting a project event and/or alert to the user device pursuant to functionality of the composite application, wherein the presentation of the project event and/or alert is presented to the user device in accordance with the presentation paradigm associated with the composite application.

2. A method according to claim 1, wherein each of the one or more composite application components comprise a user-interface (UI) pattern, a reusable object model, and/or a methodology.

3. A method according to claim 2, wherein the working mode is selected from the group consisting of: monitor mode, search mode, and reporting mode and wherein the presentation paradigm is selected from the group consisting of: process simulation view and process comparison view.

4. A method according to claim 1, wherein the enterprise data is selected from the group consisting of: process metadata, and a project event, a collaboration process.

5. A method according to claim 1, wherein the presentation paradigm is a process simulation view or a process comparison view.

6. A method according to claim 1, wherein determining the working mode associated with the client device comprises:

determining user preferences for a user executing the software program; and determining the working mode based at least in part on the user preferences.

7. A method according to claim 6, wherein determining the user preferences comprises:

providing a personalization dialog at the user device to receive user input;

associating user preferences received from the personalization dialog with a working mode; and storing the working mode and user preferences association.

8. A method according to claim 1, wherein the underlying one or more enterprise application platforms of the enterprise system comprises at least office productivity software, and wherein determining the working mode further comprises determining an environment of the office productivity software selectable at the user device to determine the working mode.

9. A method according to claim 8, wherein determining the environment of the office productivity software comprises determining a document type selected at the user device for execution.

10. A method according to claim 8, wherein determining the environment of the office productivity software comprises determining content of a document selected at the user device for execution.

11. A method according to claim 1, wherein determining the working mode further comprises determining a level of relatedness data desired based on preferences at the user device.

12. A method according to claim 1, wherein associating the presentation paradigm based on the determined working mode comprises associating the presentation paradigm associated with the determined working mode in a working mode association table.

13. A method according to claim 1, wherein associating the presentation paradigm is further based at least in part on an amount of relatedness data associated with the determined working mode to present at the user device.

14. The method of claim 1, wherein the project event and/or alert solicits an input via the user device responsive to the project event and/or alert in fulfillment of a project step associated with the composite application.

15. An enterprise system comprising:

a memory to store instructions for execution by computing hardware of the enterprise system;

a presentation agent coupled with the memory and computing hardware for presenting enterprise data of the enterprise system in accordance with one of a plurality of working modes selectable via a user device communicably interfaced with the enterprise system, the presentation agent comprising:

a composite application framework to de-couple one or more composite application components from an underlying one or more enterprise application platforms of the enterprise system, wherein the composite application framework provides an integration infrastructure to create a composite application from the one or more composite application components, and wherein the one or more composite application components comprise functionality to be integrated by the composite application framework;

a determine context feature to determine a working mode associated with the user device based on a user preference indicated by the user device, the working mode to affect the manner in which the enterprise data is presented to and displayed via the user device;

the composite application framework to further create the composite application by integrating the one or more composite application components;

an associate presentation feature to associate a presentation paradigm with the composite application based at least in part on the determined working mode associated with the user device; and a provide display feature to present the enterprise data to the user device in accordance with the presentation paradigm associated with the composite application in the context of the composite application, wherein the provide display feature to present the enterprise data in the context of the composite application comprises the provide display feature to present a project event and/or alert to the user device pursuant to functionality of the composite application, wherein the presentation of the project event and/or alert is presented to the user device in accordance with the presentation paradigm associated with the composite application.

16. An enterprise system according to claim 15, wherein the determine context feature to further:

determine an identity of a user at the user device requesting execution of the composite application; and select the presentation paradigm based at least in part on permissions associated with the user.

17. An enterprise system according to claim 15, wherein the working mode comprises a process analysis mode.

18. An enterprise system according to claim 15, wherein the presentation paradigm is selected from the group consisting of: a process simulation view and a process comparison view.

19. An enterprise system according to claim 15, wherein the enterprise data comprises one or more project event derived from a collaboration process.

20. A computer-readable storage medium having instructions stored thereon that, when executed by an enterprise system, the instructions cause the enterprise system to perform a method in the enterprise system, wherein the enterprise system comprises a presentation agent for presenting enterprise data of the enterprise system in accordance with one of a plurality of working modes selectable via a user device communicably interfaced with the enterprise system, and wherein the method comprises:

determining, via a determine context feature of the presentation agent, a working mode associated with the user device based on a user preference indicated by the user device, the working mode to affect the manner in which the enterprise data is presented to and displayed via the user device;

de-coupling, via a composite application framework of the enterprise system, one or more composite application components from an underlying one or more enterprise application platforms of the enterprise system, wherein the composite application framework provides an integration infrastructure for creating a composite application from the one or more composite application components, and wherein the one or more composite application components comprise functionality to be integrated by the composite application framework;

creating the composite application, via the composite application framework, by integrating the one or more composite application components;

associating, via an associate presentation feature of the presentation agent, a presentation paradigm with the composite application based at least in part on the determined working mode associated with the user device; and presenting, via a provide display feature of the presentation agent, the enterprise data to the user device in accordance with the presentation paradigm associated with the composite application in the context of the composite application, wherein presenting the enterprise data in the context of the composite application comprises presenting a project event and/or alert to the user device pursuant to functionality of the composite application, wherein the presentation of the project event and/or alert is presented to the user device in accordance with the presentation paradigm associated with the composite application.

21. The computer-readable storage medium of claim 20, wherein each of the one or more composite application components comprise a user-interface (UI) pattern, a reusable object model, and/or a methodology.

* * * * *